US012767450B2

(12) United States Patent
Austrheim et al.

(10) Patent No.: US 12,767,450 B2
(45) Date of Patent: Oct. 20, 2026

(54) TRACK SENSOR ARRANGEMENT

(71) Applicant: AutoStore Technology AS, Nedre Vats (NO)

(72) Inventors: Trond Austrheim, Etne (NO); Ivar Fjeldheim, Haugesund (NO); Geir Korge-Hårajuvet, Vikedal (NO)

(73) Assignee: AutoStore Technology AS, Nedre Vats (NO)

( * ) Notice: Subject to any disclaimer, the term of this patent is extended or adjusted under 35 U.S.C. 154(b) by 129 days.

(21) Appl. No.: 18/841,943

(22) PCT Filed: Mar. 6, 2023

(86) PCT No.: PCT/EP2023/055575

§ 371 (c)(1),
(2) Date: Aug. 27, 2024

(87) PCT Pub. No.: WO2023/169987

PCT Pub. Date: Sep. 14, 2023

(65) Prior Publication Data

US 2025/0171240 A1 May 29, 2025

(30) Foreign Application Priority Data

Mar. 8, 2022 (NO) .................................... 20220290
Mar. 25, 2022 (NO) .................................... 20220361

(51) Int. Cl.
*B65G 43/00* (2006.01)
*B65G 1/04* (2006.01)
*B65G 1/06* (2006.01)

(52) U.S. Cl.
CPC ........... *B65G 43/00* (2013.01); *B65G 1/0464* (2013.01); *B65G 1/065* (2013.01); (Continued)

(58) Field of Classification Search
CPC ... B61L 23/042; B65G 1/0464; B65G 1/0478; B65G 2203/0283; B65G 43/00;
(Continued)

(56) References Cited

U.S. PATENT DOCUMENTS

2016/0229630 A1 8/2016 Gebhardt et al.
2017/0305668 A1 10/2017 Bestic et al.
(Continued)

FOREIGN PATENT DOCUMENTS

CN 209167899 U 7/2019
CN 111634596 A 9/2020
(Continued)

OTHER PUBLICATIONS

International Searching Authority, International Search Report and Written Opinion for International Application No. PCT/EP2023/055575, mailed Jun. 13, 2023, 9 pages.
(Continued)

*Primary Examiner* — Timothy R Waggoner
(74) *Attorney, Agent, or Firm* — Baker Botts L.L.P.

(57) ABSTRACT

The present invention provides an improved track sensor arrangement for an automated vehicle operating on an automated storage and retrieval system, arranged whereby the sensor directly detects the position of the vehicle in relation to an access opening. The term "directly detects" in the context of the present invention is to be understood to mean that the gripping mechanism of the vehicle is correctly positioned in relation to the access opening at the precise moment the sensor detects a specific structural feature of a track. In one aspect the specific structural feature of the track is an intersection adjacent to an access opening.

16 Claims, 19 Drawing Sheets

(52) U.S. Cl.
CPC ................ *B65G 2201/0235* (2013.01); *B65G 2203/0283* (2013.01); *B65G 2203/044* (2013.01)

(58) Field of Classification Search
CPC ............ B65G 1/065; B65G 2201/0235; B65G 2203/044; B65G 1/1378
See application file for complete search history.

(56) References Cited

U.S. PATENT DOCUMENTS

| | | | | |
|---|---|---|---|---|
| 2021/0086782 | A1 | 3/2021 | Austrheim | |
| 2021/0155408 | A1 | 5/2021 | Austrheim | |
| 2023/0024692 | A1 * | 1/2023 | Austrheim | B65G 1/0464 |
| 2024/0417168 | A1 * | 12/2024 | Lie | B65G 1/04 |

FOREIGN PATENT DOCUMENTS

| | | | |
|---|---|---|---|
| CN | 112262084 | A | 1/2021 |
| CN | 113753458 | A | 12/2021 |
| NO | 317366 | B1 | 10/2004 |
| WO | 2014075937 | A1 | 5/2014 |
| WO | 2014090684 | A1 | 6/2014 |
| WO | 2015193278 | A1 | 12/2015 |
| WO | 2018082972 | A1 | 5/2018 |
| WO | 2018146304 | A1 | 8/2018 |
| WO | 2019170805 | A1 | 9/2019 |
| WO | 2019206487 | A1 | 10/2019 |
| WO | 2019238670 | A1 | 12/2019 |
| WO | 2021122619 | A1 | 6/2021 |
| WO | 2022058550 | A1 | 3/2022 |

OTHER PUBLICATIONS

Pascal Versini, Norwegian Search Report for Norwegian Patent Application No. 20220361, Patentstyret, mailed Oct. 14, 2022, 2 pages.

Pascal Versini, Office action for Norwegian Patent Application No. 20220361, Norwegian Industrial Property Office, mailed Oct. 14, 2022, 6 pages.

Zhang, Jichang, Office Action in Chinese patent application 202380026500.X, mailed Aug. 20, 2026, 13 pages, The State Intellectual Property Office of the People's Republic of China, Beijing, China.

* cited by examiner

TRACK SENSOR ARRANGEMENT

BENEFIT CLAIM

This application claims the benefit as a § 371 national stage entry of PCT international application PCT/EP2023/055575, filed 6 Mar. 2023, which claims the benefit of Norway application 20220290, filed 8 Mar. 2022 and Norway application 20220361, filed 25 Mar. 2022, the entire contents of which are hereby incorporated by reference for all purposes as if fully set forth herein.

FIELD OF THE INVENTION

The present invention relates to a remotely operated vehicles operating in connection with an automated storage and retrieval system, in particular to an arrangement comprising a track sensor mounted to an automated vehicle for determining the position of the vehicle on a grid-based track system of the automated storage and retrieval system.

BACKGROUND AND PRIOR ART

FIG. 1 discloses a prior art automated storage and retrieval system 1 with a framework structure 100 and FIG. 2, FIG. 3, and FIG. 4 disclose three different prior art container handling vehicles 201,301,401 suitable for operating on such a system 1.

The framework structure 100 comprises upright members 102 arranged in rows to define a storage volume comprising storage columns 105 arranged in rows between the upright members 102. In these storage columns 105 storage containers 106, also known as bins, are stacked one on top of one another to form stacks 107. The members 102 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301,401 may be operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301,401 in a first direction X across the top of the frame structure 100, and a second set of parallel rails 111 arranged perpendicular to the first set of rails 110 to guide movement of the container handling vehicles 201,301,401 in a second direction Y which is perpendicular to the first direction X. Containers 106 stored in the columns 105 are accessed by the container handling vehicles 201,301,401 through access openings 112 in the rail system 108. The container handling vehicles 201,301,401 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supporting.

Each prior art container handling vehicle 201,301,401 comprises a vehicle body 201*a*,301*a*,401*a* and first and second sets of wheels 201*b*, 201*c*, 301*b*, 301*c*,401*b*,401*c* which enable the lateral movement of the container handling vehicles 201,301,401 in the X direction and in the Y direction, respectively. In FIG. 2, FIG. 3 and FIG. 4 two wheels in each set are fully visible. The first set of wheels 201*b*,301*b*,401*b* is arranged to engage with two adjacent rails of the first set 110 of rails, and the second set of wheels 201*c*,301*c*,401*c* is arranged to engage with two adjacent rails of the second set 111 of rails. At least one of the sets of wheels 201*b*, 201*c*, 301*b*,301*c*,401*b*,401*c* can be lifted and lowered, so that the first set of wheels 201*b*,301*b*,401*b* and/or the second set of wheels 201*c*,301*c*,401*c* can be engaged with the respective set of rails 110, 111 at any one time.

Each prior art container handling vehicle 201,301,401 also comprises a lifting device for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301,401 so that the position of the gripping/engaging devices with respect to the vehicle 201,301,401 can be adjusted in a third direction Z which is orthogonal the first direction X and the second direction Y. Parts of the gripping device of the container handling vehicles 301,401 are shown in FIG. 3 and FIG. 4 indicated with reference number 304,404. The gripping device of the container handling device 201 is located within the vehicle body 201*a* in FIG. 2 and is thus not shown.

Conventionally, and also for the purpose of this application, Z=1 identifies the uppermost layer available for storage containers below the rails 110,111, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=17, Y=1, Z=6. The container handling vehicles 201,301,401 can be said to travel in layer Z=0, and each storage column 105 can be identified by its X and Y coordinates. Thus, the storage containers shown in FIG. 1 extending above the rail system 108 are also said to be arranged in layer Z=0.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y- and Z-direction.

Each prior art container handling vehicle 201,301,401 comprises a storage compartment or space for receiving and stowing a storage container 106 when transporting the storage container 106 across the rail system 108. The storage space may comprise a cavity arranged internally within the vehicle body 201*a*,401*a* as shown in FIG. 2 and FIG. 4 and as described in e.g. WO2015/193278A1 and WO2019/206487A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The cavity container handling vehicle 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the cavity container handling vehicles 401 may have a footprint which is larger than the lateral area defined by a storage column 105 as shown in FIGS. 1 and 4, e.g. as is disclosed in WO2014/090684A1 or WO2019/206487A1.

As shown in FIG. 5, the rail system 108 typically comprises rails 110 with grooves 501 in which the wheels of the vehicles run. Grooves 501 are defined by upwardly protruding elements 502. These grooves 501 and upwardly protruding elements 502 are collectively known as tracks 503 and upwardly protruding elements 502 may alternately be referred to as "track walls" 502. Each rail may comprise one track, or each rail 110,111 may comprise two parallel tracks. In other rail systems 108, each rail in one direction (e.g. an X direction) may comprise one track and each rail in the other, perpendicular direction (e.g. a Y direction) may comprise two tracks. Each rail 110,111 may also comprise two track members that are fastened together, each track member providing one of a pair of tracks provided by each rail. As also shown in FIG. 5, perpendicular tracks 503 intersect to form intersections 504, within which intersection there are no upwardly protruding elements 502 in order to permit the wheels of vehicles to cross the intersection in either the X or the Y direction.

WO2018/146304A1, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301,401 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. The transportation from the port to the access station may require movement along various different directions, by means such as delivery vehicles, trolleys or other transportation lines. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301,401 can drop off storage containers 106 to be transported to an access or a transfer station, and the second port column 120 may be a dedicated pick-up port column where the container handling vehicles 201,301,401 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301,401 is instructed to retrieve the target storage container 106 from its position and transport it to the drop-off port column 119. This operation involves moving the container handling vehicle 201,301,401 to a location above the storage column 105 in which the target storage container 106 is positioned, retrieving the storage container 106 from the storage column 105 using the container handling vehicle's 201,301,401 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles 201,301,401 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105. When a storage container 106 is to be stored in one of the columns 105, one of the container handling vehicles 201,301,401 is instructed to pick up the storage container 106 from the pick-up port column 120 and transport it to a location above the storage column 105 where it is to be stored. After any storage containers 106 positioned at or above the target position within the stack 107 have been removed, the container handling vehicle 201,301,401 positions the storage container 106 at the desired position. The removed storage containers 106 may then be lowered back into the storage column 105, or relocated to other storage columns 105.

For monitoring and controlling the automated storage and retrieval system 1, e.g. monitoring and controlling the location of respective storage containers 106 within the framework structure 100, the content of each storage container 106, and the movement of the container handling vehicles 201,301,401 so that a desired storage container 106 can be delivered to the desired location at the desired time without the container handling vehicles 201,301,401 colliding with each other, the automated storage and retrieval system 1 comprises a control system 500 which typically is computerized and which typically comprises a database for keeping track of the storage containers 106.

On this background, it is desirable in the art to provide container handling vehicles combining most valuable properties of the vehicles of cantilever type and of those having an internally arranged cavity.

Track Sensors

It is desirable that the control system 500 is aware of the precise positioning of the container handling vehicles described above as they travel along and/or stop on rail system 108. In particular it is desirable that a container handling vehicle is accurately positioned such that the lifting device of the vehicle is precisely aligned in relation to an access opening 112 when a lifting or lowering operation is intended. Such access openings are defined by two sets of parallel tracks that intersect, creating four adjacent intersections 504 about the access opening.

It is known to arrange a sensor or sensors on a container handling vehicle that detects the position of the vehicle as it travels along or stops on the rails of the rail system. In particular, a known sensor arranged on a vehicle of the type illustrated as vehicle 301 is capable of detecting when the vehicle 301 encounters an intersection 504 of perpendicular tracks 503. Such sensor has a single emitter and detector.

Due to the shape and configuration of vehicle 301, with its gripping device 304 arranged on an extended cantilever, the gripping device is not aligned over an access opening of interest at the moment the sensor detects an adjacent intersection 504. Rather, the sensor detects when it passes a preceding intersection, and control system 500 then "counts" a predetermined number of wheel rotations as the vehicle advances farther in order to determine that gripping mechanism 304 is correctly positioned over the access opening of interest. There is therefore a need for a sensor arrangement that detects a structure of the track system, in particular an intersection, at the moment the vehicle is correctly positioned with is gripping device above an access opening of interest.

SUMMARY OF THE INVENTION

The present invention is set forth and characterized in the independent claim, while the dependent claims describe other characteristics of the invention.

The present invention provides an improved track sensor arrangement for an automated vehicle operating on an automated storage and retrieval system, arranged whereby the sensor directly detects the position of the vehicle in relation to an access opening. The term "directly detects" in the context of the present invention is to be understood to mean that the gripping mechanism of the vehicle is correctly positioned in relation to the access opening while the sensor simultaneously detects a specific structural feature of a track. In one aspect the specific structural feature of the track is an intersection adjacent to an access opening, more specifically the terminal end of a track wall at the intersection.

The invention relates to a track sensor arranged on a remotely operated container-handling vehicle or other type of vehicle for operation on a two-dimensional grid-based rail system of an automated storage and retrieval system. Such vehicle may comprise a vehicle body and a first set of wheels enabling movement of the remotely operated vehicle in a first direction of the rail system and a second set of wheels enabling movement of the remotely operated vehicle in a second direction of the rail system, said second direction being perpendicular to the first direction. Such a vehicle changes direction on the grid-based rail system by selectively raising or lowering the sets of wheels in an operation known as "track shift".

For the purposes of this application, the terms "container handling vehicle", "remotely operated vehicle" and "automated vehicle" all refer to a robotic wheeled vehicle operating on a rail system arranged across the top of the framework structure being part of an automated storage and retrieval system.

The term "storage container" as used herein defines a receptacle for storing items. Alternate descriptive terms for such a container may be "goods container", "goods holder", "item container", "storage bin" and the like. In this context, the storage container can be a bin, a tote, a pallet, a tray or similar. Different types of goods holders may be used in the same automated storage and retrieval system. The terms "storage container" may in certain contexts be considered to be analogous to an actual item that is capable of being gripped, lifted and lowered by the vehicles of the system even though the item is not stored in a separate container.

The relative terms "upper", "lower", "below", "above", "higher" etc. shall be understood in their normal sense and as seen in a Cartesian coordinate system. When mentioned in relation to a rail system, "upper" or "above" shall be understood as a position closer to the surface rail system (relative to another component), contrary to the terms "lower" or "below" which shall be understood as a position further away from the rail system (relative another component).

According to one aspect, the invention comprises:

a. an automated, wheeled vehicle arranged to travel along a grid-based rail system, the rail system comprising a plurality of parallel rails arranged in a first direction and a plurality of parallel rails arranged in a second direction, the rails in the first and second directions intersecting perpendicularly in order to form of plurality of intersections defining a plurality of grid access openings, each rail provided with either a single track or a pair of parallel tracks for wheels of the vehicle, each track being in the form of a groove defined by upwardly projecting track walls said track walls terminating at terminal ends at the intersections, the vehicle being able to change its direction of travel from the first direction to the second direction by alternately raising or lowering sets of wheels into and out of the tracks, a first set of wheels arranged for travel in the first direction and a second set of wheels arranged for travel in the second direction, b. a sensor attached to the vehicle and arranged such that the sensor is lowered or raised when the first set of wheels is lowered or raised, the sensor comprising:

i. a sensor body having a recess arranged to receive a track wall of a track when the first set of wheels is lowered into the track, ii. a plurality of emitters, each arranged to emit a beam of energy, and one or more corresponding detectors arranged to detect the beams of energy from the emitters, iii. wherein the emitters and the corresponding detector or detectors are arranged on opposite sides of the recess, such that the track wall blocks the beam emitted from the emitters from reaching their corresponding detectors when the first set of wheels is lowered into the track, iv. and further wherein the sensor is attached to the vehicle at a position whereby a beam from an emitter is capable of reaching its corresponding detector when a predetermined part of the vehicle is positioned over an access opening of interest.

According to another aspect, the invention comprises:

A method for determining the position of an automated vehicle operating on a grid-based rail system, the rail system comprising a plurality of parallel rails arranged in a first direction, the rails in the first and second directions intersecting perpendicularly in order to form of plurality of intersections defining a plurality of grid access openings, each rail provided with either a single track or a pair of parallel tracks for wheels of the vehicle, each track being in the form of a groove defined by upwardly projecting track walls said track walls terminating at terminal ends at the intersections, the vehicle being able to change its direction of travel from the first direction to the second direction by alternately raising or lowering sets of wheels into and out of the tracks, a first set of wheels arranged for travel in the first direction and a second set of wheels arranged for travel in the second direction, CHARACTERIZED IN THAT the method comprises:

a. providing a sensor, the sensor comprising:

i. a sensor body having a recess arranged to receive a track wall of a track when the first set of wheels is lowered into the track, ii. a plurality of emitters, each arranged to emit a beam of energy, and one or more corresponding detectors arranged to detect the beams of energy from the emitters, iii. wherein the emitters and the corresponding detector or detectors are arranged on opposite sides of the recess, such that the track wall blocks the beam emitted from the emitters from reaching their corresponding detectors when the first set of wheels is lowered into the track, b. attaching the sensor to the vehicle at a position whereby a beam from an emitter is capable of reaching its corresponding detector while a predetermined part of the vehicle is positioned over an access opening of interest, c. lowering the first set of wheels of the vehicle into a track in order for the vehicle to travel in the first direction, whereby the sensor is also lowered such that the track wall enters the recess and blocks the beams from the emitters from reaching their corresponding detectors, d. causing the vehicle to travel in the first direction until the beam from an emitter passes the terminal end of a track wall at an intersection adjacent to the access opening of interest, and e. stopping the vehicle when the sensor is positioned relative to the adjacent intersection such that the predetermined part of the vehicle is aligned over the access opening of interest.

According to one aspect, the present invention provides an arrangement comprising at least one track sensor mounted on an automated vehicle for detecting the position of the vehicle in relation to the tracks of the rail system of an automated storage and retrieval system as the vehicle travels in the first direction. In one aspect, a plurality of sensors are arranged on the vehicle, at least one sensor arranged for detecting position in relation to travel in the first direction, and at least one sensor arranged for detecting position in relation to travel in the second direction. Hereafter, the arrangement shall be described by referring to such sensor or sensors in the singular (a sensor/the sensor), however it should be understood that the plural form of such description would apply if the arrangement comprises more than one sensor.

The sensor according to one aspect of the invention comprises a sensor body having a recess longitudinally arranged in the direction of travel of the vehicle. A plurality of emitters are arranged along one side of the recess, each emitter having a corresponding detector arranged on the opposite side of the recess. The term "corresponding detector" for an emitter should be understood to encompass an arrangement where each emitted is associated with its own unique detector, as well as an arrangement where a detector may detect the beams from more than one emitter. In the latter case, more than one emitter would have the same detector as their "corresponding" detector. In an alternate embodiment the sensor body is "L" shaped, with the emitter arranged on the short leg of the "L", and the corresponding detectors arranged at or near the end of the long leg of the "L", with the beams projecting upwardly and at an angle to their corresponding detectors. In this embodiment, the space between the emitters and the detectors, in direct line therebetween, may be considered analogous to the "recess" described above.

The emitters emit beams of energy in the form of infrared signals, light signals, or any other appropriate signals known in the art.

The emitters are arranged in "series" along the recess. In this context, the term "in series" means that, as the vehicle travels in a given direction and the sensor passes a given point, the emitters will sequentially encounter this point one after the other. The first emitter to encounter the point may be termed the "leading" emitter, while the subsequent emitter or emitters of the series may be referred to as "trailing" emitters.

The sensor is attached to the vehicle such that when an associated set of wheels is raised or lowered during a track shift operation, the sensors is raised out of or lowered into the groove of a track. In order to accomplish this concerted raising and lowering the sensor may be attached to the wheel set, to a movable frame associated with the wheel set, to the vehicle body or to any other structure of the vehicle that raises or lowers in conjunction with the track shift operation.

When a wheel set is lowered into contact with the rails, the sensor associated with that wheel set is lowered such that the track wall blocks the line of sight between the emitters and their corresponding detectors. In one embodiment the wall enters the recess of the sensor body, while in the embodiment with an L-shaped sensor body the wall enters the recess between the emitters and their corresponding detectors. The track wall thus will block the beams from the emitters from reaching their corresponding detectors. When the wheel set is raised, the associated sensor is also raised out of the groove such that the track wall is not inside the recess and the beams are not blocked.

In one embodiment, the sensor of the present invention is arranged on the underside of the vehicle, within the periphery of the vehicle defined by the outer walls or extremities of the vehicle body, and connected to the vehicle such that, when a track shift operation of the vehicle is activated to configure the vehicle for traveling in the first direction a first sensor associated with a first wheel set is lowered to a position in the groove of the track. A second sensor associated with a second wheel set is in the same operation raised to a position above the groove of the track. Conversely, when the track shift mechanism of the vehicle is activated to configured the vehicle for traveling in the second direction the second sensor is lowered to a position in the groove of the track and the first sensor is raised above the groove of the track.

The sensor is in electronic communication with the control system of the automated storage and retrieval system, alternatively directly with an onboard control system of the vehicle itself. As the vehicle travels along a segment of track that has a track wall, the beams from all of the emitters of the sensor in the groove will be blocked. Since, as described above, the tracks of the rail system have track wall between the intersections defining access openings, the control system will thus recognize that the vehicle is currently located between access openings of the grid when all of the beams are blocked. When the vehicle travels to a position where the track does not have a track wall, such as at an intersection of perpendicular tracks, the beams are not blocked and thus may reach their corresponding detectors. By virtue of the serial arrangement of the emitters, the beam from the leading emitter will be able to reach its corresponding detector at the instant the leading beam passes the end of the track wall, while the beam or beams from the trailing emitters will continue to be blocked. The leading sensor may thus immediately detect the end of the track wall. The sensor thereby directly detects the position of the vehicle with respect to the end of the track wall, in particular at an intersection. According to one aspect, the distance between the leading sensor and a trailing sensor corresponds to a tolerance deviation for positioning of the vehicle with respect to an access opening.

According to one embodiment, sensor comprises a leading emitter, a first trailing emitter and a second trailing emitter. The sensor is arranged on the vehicle such that the gripping device of the vehicle is aligned over an access opening when the beam of the leading emitter is blocked from reaching its corresponding detector by a structure of an adjacent intersection while the beams of the first and second trailing emitters reach their respective detectors. Further according to this embodiment, the emitters are arranged on the sensor such the vehicle is out of position with respect to the access opening of interest if one of the following conditions is met:

a. the beam from the leading emitter and the beam from the first trailing emitter are detected by their corresponding detectors while the beam from the second trailing emitter is blocked from reaching its detector, or
b. the beams from the leading emitter and the second trailing emitter are detected by their corresponding detectors while the beam from the first trailing emitter is blocked, or
c. The beams from all three emitters are detected by their corresponding detectors.

In use with this embodiment, the vehicle will be driven to an intersection adjacent an access opening of interest. As the sensor passes the terminal end of the track wall, the beam from leading emitter will first be detected, while the beams from the first and second trailing emitters remain blocked. As the vehicle advances, the leading beam and first trailing beam will be detected, while the second trailing beam remains blocked. As the vehicle advances to its correct position, the leading beam will be blocked by the terminal end of the next track wall at the intersection, while the beams from the two trailing emitters are in the intersection such that their beams are detected. The placement of the emitters in the sensor body is such that any combination of detected/blocked beams other than "blocked-detected-detected" indicates an incorrect alignment with respect to the intersection.

The sensor of the invention is preferably mounted to the vehicle at a position whereby the gripping device of the vehicle is aligned over an access opening precisely when the sensor is correctly positioned with respect to structures of an intersection. The precise mounting position of the sensor on the vehicle is thus dependent upon the shape and size of the vehicle and the position of the gripping device on the vehicle.

In one embodiment, the vehicle of the present invention is configured as follows, but it should be understood that the sensor of the present invention can be mounted to other types of vehicles if space and configuration permits.

In one aspect, the sensor is connected to a remotely operated vehicle for handling a storage container while operating on a two-dimensional rail system of an automated storage and retrieval system, wherein said vehicle comprises a vehicle body and a first set of wheels enabling movement of the remotely operated vehicle in a first horizontal direction of the rail system and a second set of wheels enabling movement of the remotely operated vehicle in a second horizontal direction of the rail system, said second direction being perpendicular to the first direction, wherein the vehicle body comprises a motor section that houses at least one drive motor and a cavity section that provides a cavity for storing a storage container, the remotely operated vehicle having a center of gravity located in the cavity section wherein the first set of wheels comprises a pair of driven wheels and a pair of passive wheels, the pair of passive wheels being provided in the cavity section to transfer a share of a load from the remotely operated vehicle to the rail system when moving in the first horizontal direction, the pair of passive wheels being arranged on an opposite side of the center of gravity to the pair of driven wheels of the first set of wheels.

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE INVENTION

Figure 1:
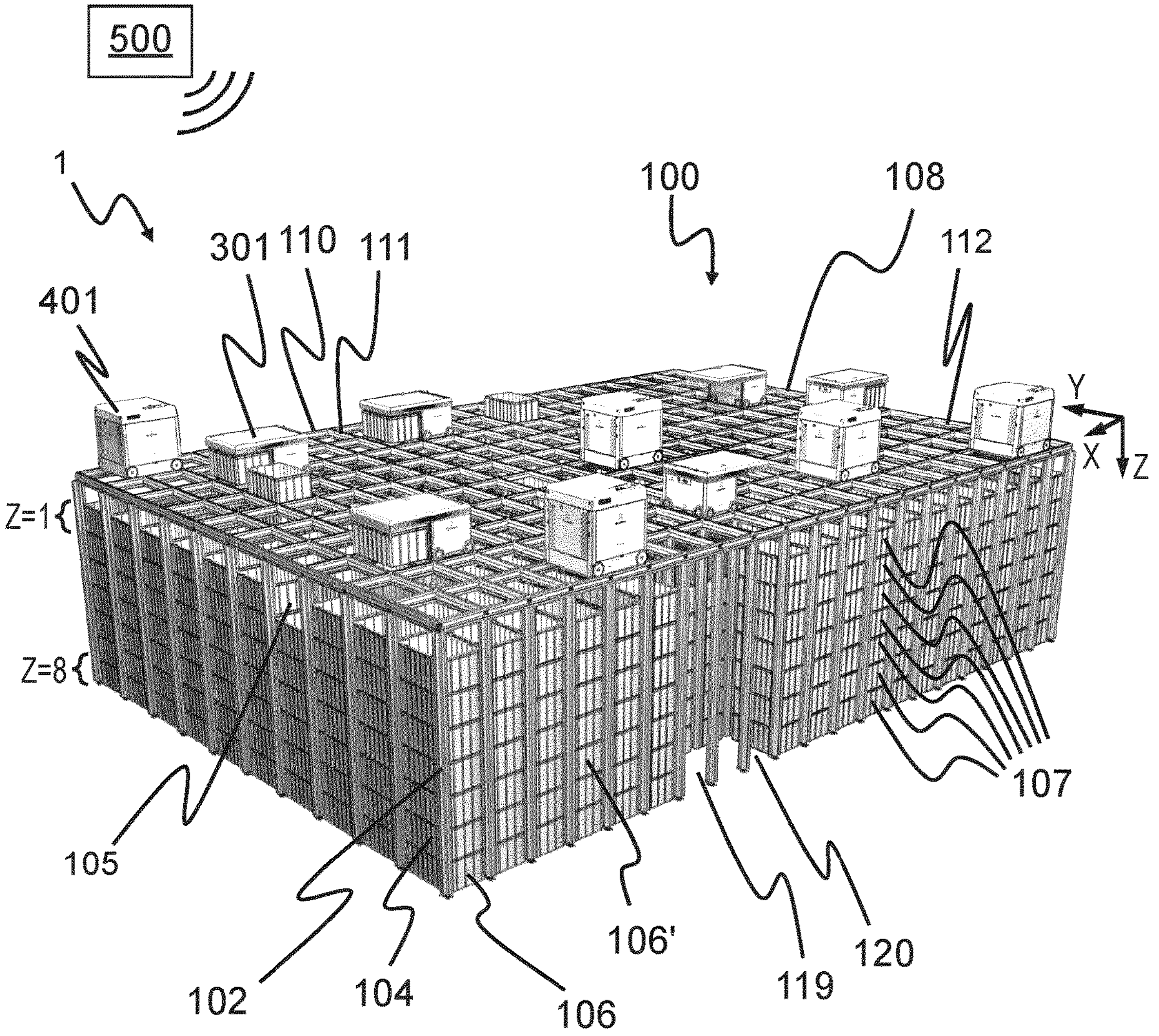
FIG. 1 (Prior Art)
FIG. 1 is a perspective view of a framework structure of a prior art automated storage and retrieval system.
Figure 2:
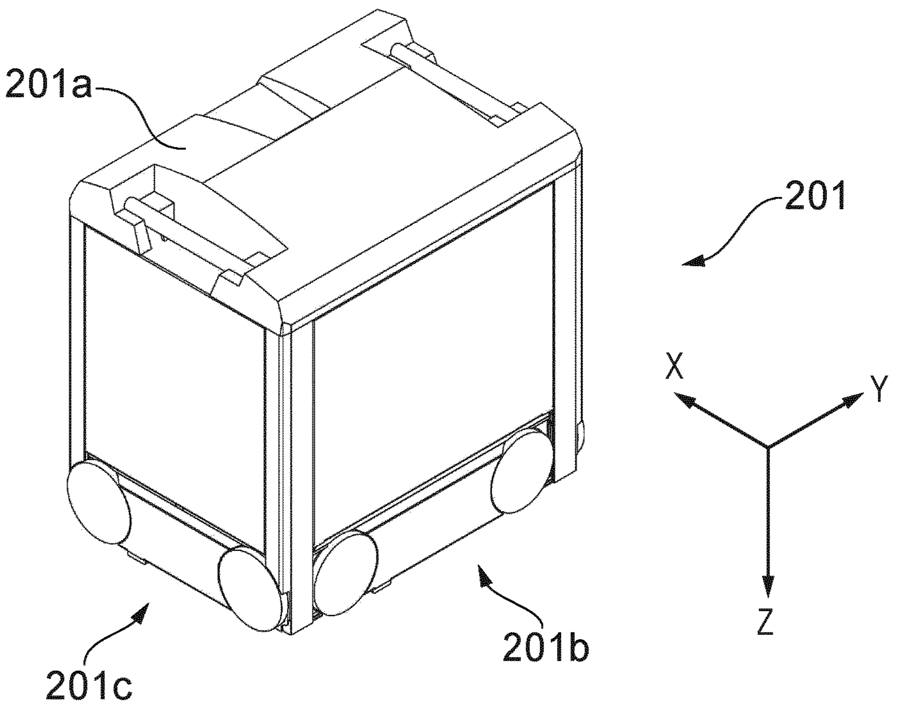
FIG. 2 (Prior Art)
FIG. 2 is a perspective view of a prior art container handling vehicle having an internally arranged cavity for carrying storage containers therein.
Figure 3:
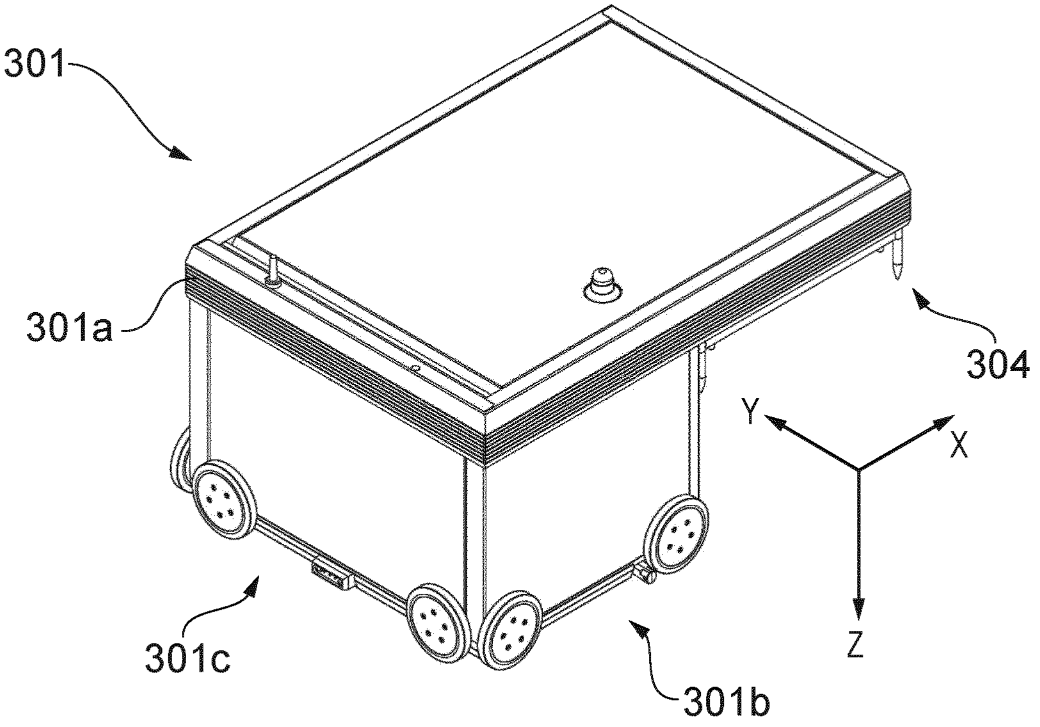
FIG. 3 (Prior Art)
FIG. 3 is a perspective view of a prior art container handling vehicle having a cantilever for carrying storage containers underneath.
Figure 4:
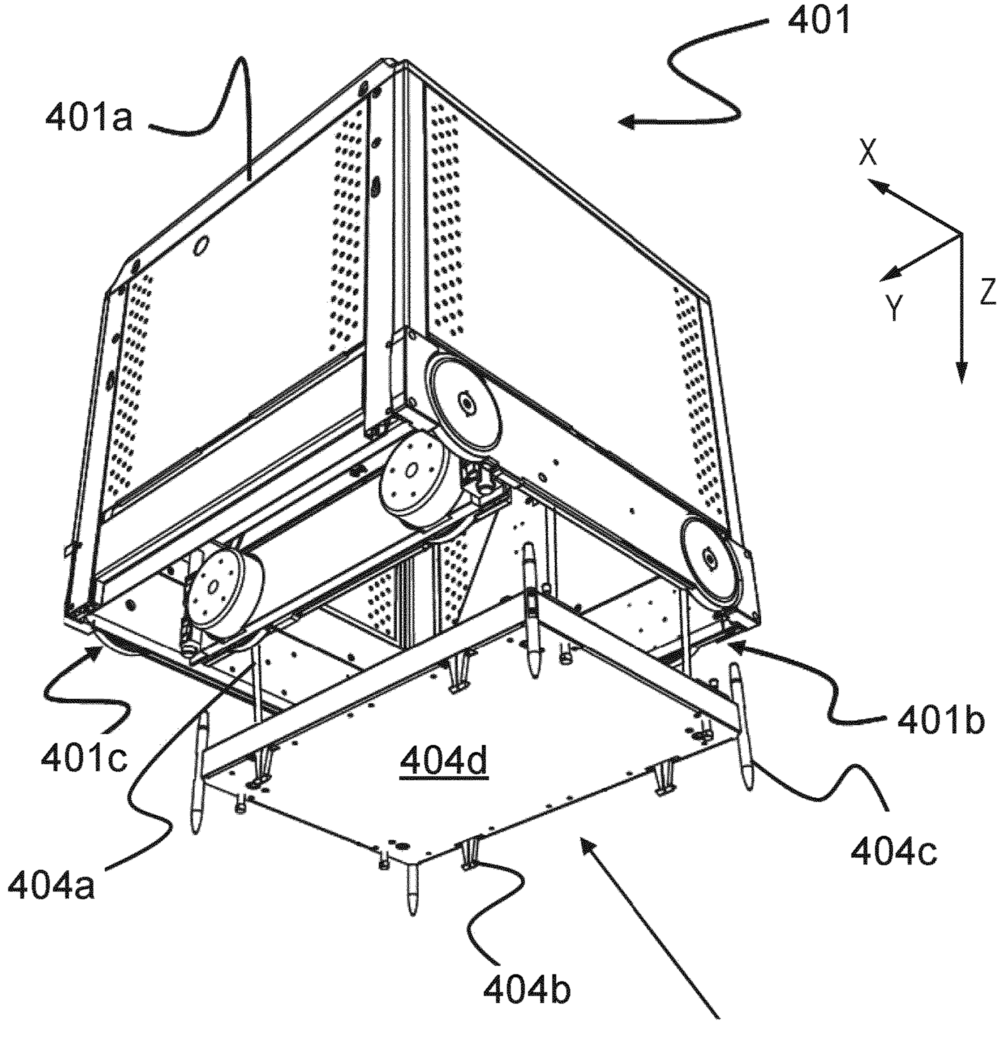
FIG. 4 (Prior Art)
FIG. 4 is a perspective view, seen from below, of a prior art container handling vehicle having an internally arranged cavity for carrying storage containers therein.

In the following, embodiments of the invention will be discussed in more detail with reference to the appended drawings. It should be understood, however, that the drawings are not intended to limit the invention to the subject-matter depicted in the drawings.

The framework structure 100 of the automated storage and retrieval system 1 is constructed in accordance with the prior art framework structure 100 described above in connection with FIG. 1-5, i.e. a number of upright members 102, wherein the framework structure 100 also comprises a first, upper rail system 108 in the X direction and Y direction.

The framework structure 100 further comprises storage compartments in the form of storage columns 105 provided between the members 102 where storage containers 106 are stackable in stacks 107 within the storage columns 105.

The framework structure 100 can be of any size. In particular, it is understood that the framework structure can be considerably wider and/or longer and/or deeper than disclosed in FIG. 1. For example, the framework structure 100 may have a horizontal extent of more than 700×700 columns and a storage depth of more than twelve containers.

Figure 5:
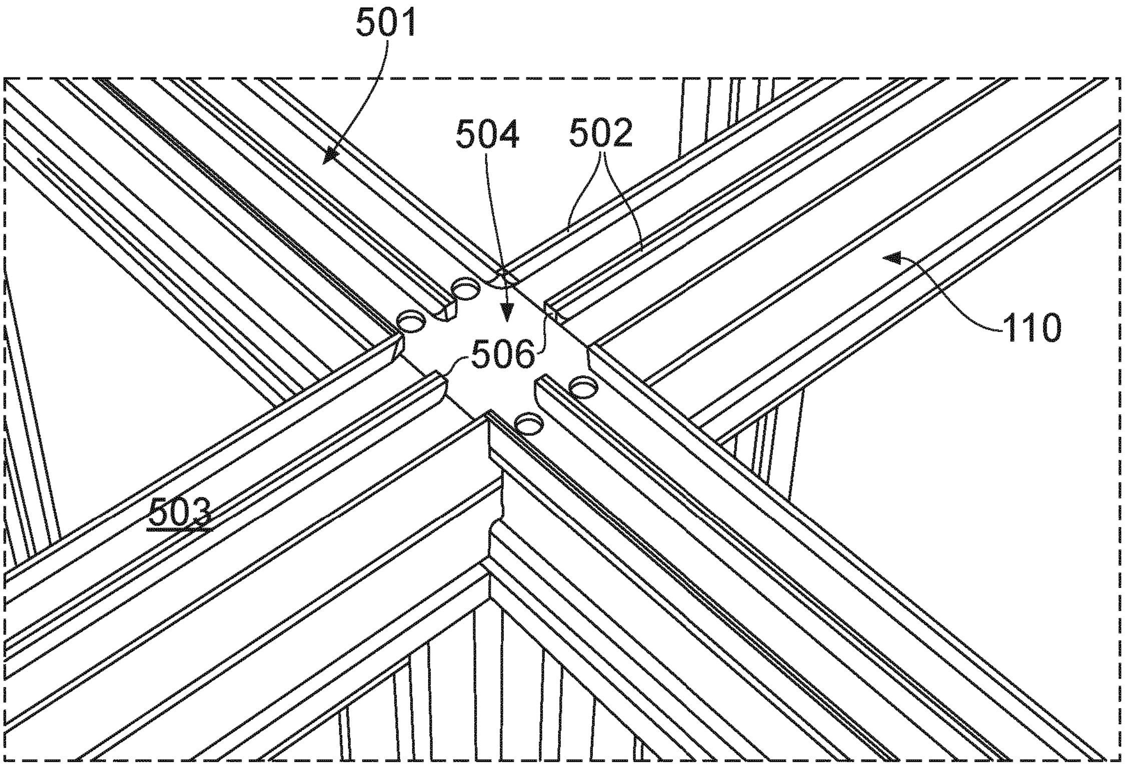
FIG. 5 (Prior Art)
FIG. 5 is a perspective view of a section of a prior art rail system showing an intersection between perpendicular tracks.

As shown in FIG. 5, the rail system 108 typically comprises rails 110 with grooves 501 in which the wheels of the vehicles run. Grooves 501 are defined by upwardly protruding elements 502. These grooves 501 and upwardly protruding elements 502 are collectively known as tracks 503 and upwardly protruding elements 502 may alternately be referred to as “track walls” 502. Each rail may comprise one track, or each rail 110 may comprise two parallel tracks. In other rail systems 108, each rail in one direction (e.g. an X direction) may comprise one track and each rail in the other, perpendicular direction (e.g. a Y direction) may comprise two tracks. Each rail 110 may also comprise two track members that are fastened together, each track member providing one of a pair of tracks provided by each rail. As also shown in FIG. 5, perpendicular tracks 503 intersect to form intersections 504, within which intersection there are no upwardly protruding elements 502 in order to permit the wheels of vehicles to cross the intersection in either the X or the Y direction. At intersections 504, the track walls 502 end at terminal ends 506.

Sensor Arrangement in Connection with Various Vehicle Embodiments

Figure 6:
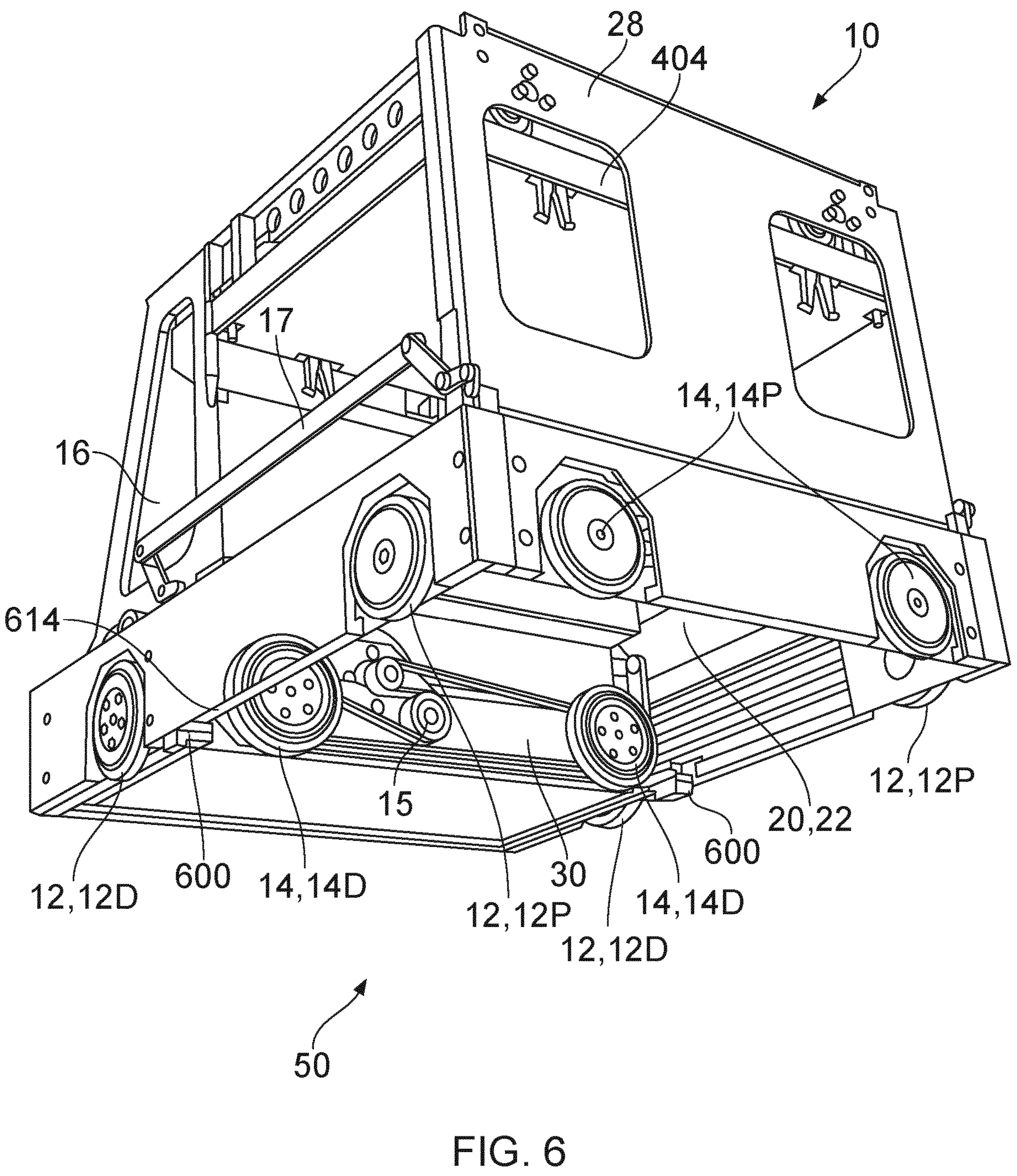
FIG. 6 is a side view of a remotely operated vehicle in accordance with one embodiment of the present invention.
Figure 7:
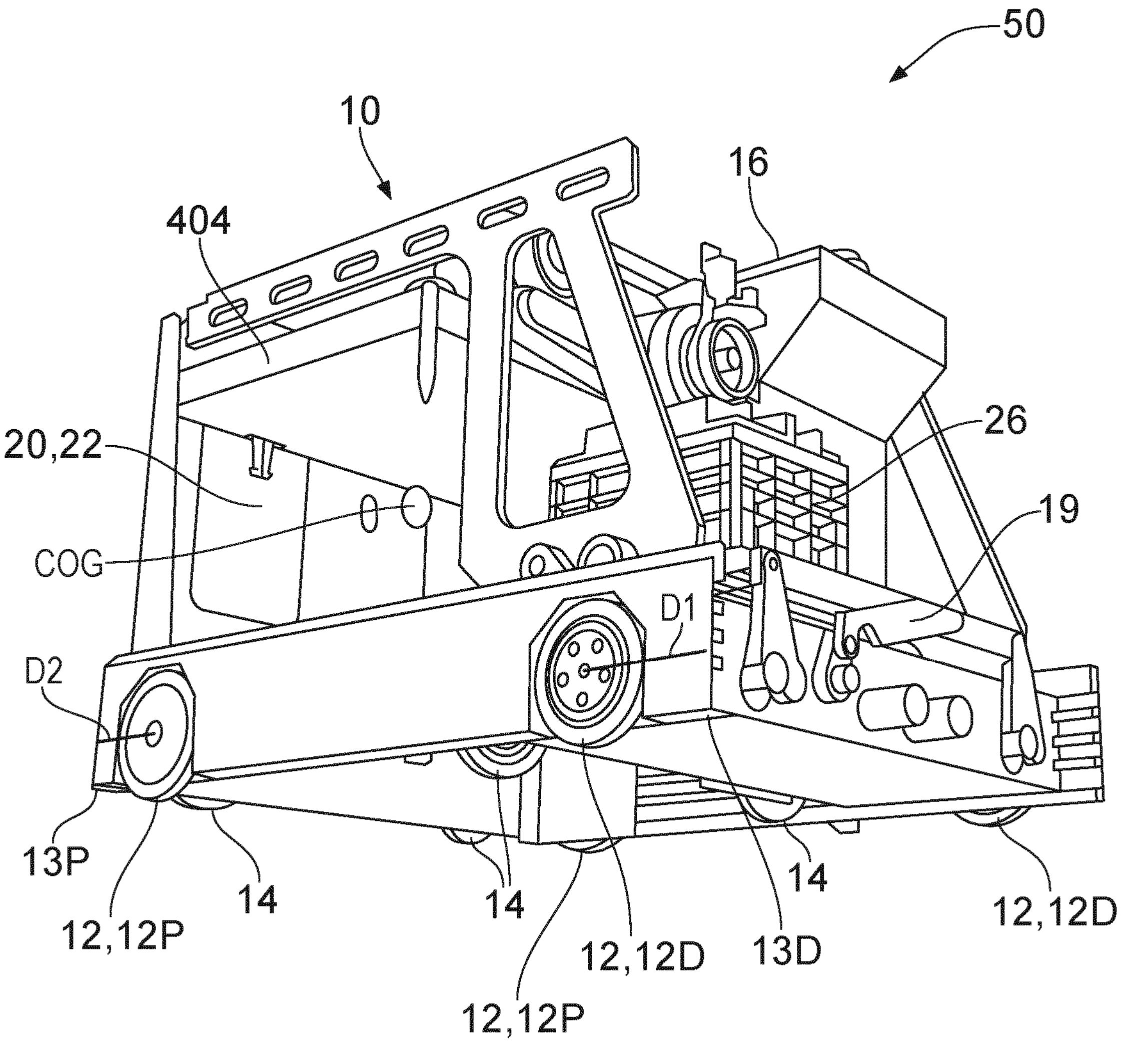
FIG. 7 is a side view of a remotely operated vehicle in accordance with another embodiment of the present invention.

In one aspect, the sensor arrangement of the present invention comprises a sensor 600 that may be connected to a known remotely-operated vehicle that operates on a grid-based rail system of an automated storage and retrieval system, as described in the background section above. In another aspect, the sensor arrangement comprises a sensor 600 connected to novel embodiments of an automated vehicle, described as follows:

A remotely operated vehicle 50 of FIG. 6 is for handling containers/goods holders while operating on a two-dimensional rail system of an automated storage and retrieval system shown in FIG. 1. The vehicle 50 comprises a vehicle body 10 and a first set of wheels 12 enabling movement of the remotely operated vehicle 50 in a first horizontal direction (for instance X-direction) of the rail system and a second set of wheels 14 enabling movement of the remotely operated vehicle 50 in a second horizontal direction (for instance Y-direction) of the rail system. With reference to FIG. 1, the second (Y) direction is perpendicular to the first (X) direction. The vehicle body 10 comprises a motor section 16 that houses at least one drive motor (shown in FIG. 6) and a cavity section 20 that provides a cavity 22 for storing a goods holder. As shown in FIG. 7, a center of gravity COG (not visible in FIG. 6) of the remotely operated vehicle 50 is located in the cavity section 20.

Turning back to FIG. 6, the first set of wheels 12 comprises a pair of driven wheels 12D and a pair of passive wheels 12P. In the shown embodiment, the pair of passive wheels 12P is provided in the cavity section 20. The passive wheels 12P transfer a share of a load from the remotely operated vehicle 50 to the rail system when said vehicle 50 is moving in the first horizontal direction. With reference to FIG. 6, FIG. 7, the pair of passive wheels 12D is arranged on an opposite side of the center of gravity COG to the pair of driven wheels 12P.

By providing the remotely operated vehicle 50 with a pair of passive (non-driven) wheels 12P, a simplified, more robust vehicle design is achieved. This also entails less complex maintenance procedure.

Vehicle design in accordance with FIG. 6 also contributes to significant weight reduction of the vehicle 50 as additional drive motors as well as motion transmission mechanisms become redundant in this configuration. In addition, reduced total weight of the vehicle 50 results in the vehicle having better acceleration properties. In a related context, total kinetic energy of the moving vehicle 50 is significantly reduced. Accordingly, accidental collisions occurring on the rail system shown in FIG. 1, involving further vehicles and/or human operators, would have less serious consequences.

Still with reference to FIG. 6, the cavity section 20 includes an external wall 28 forming part of the periphery of the remotely operated vehicle 50. The external wall 28 is flat and perpendicular to a horizontal (XY) plane of FIG. 1.

As regards a second set of wheels 14, said second set of wheels 14 comprises one pair of wheels mounted to a structural crosspiece 30 within the vehicle body 10. In FIG. 6, this pair of wheels is a pair of driven wheels 14D. A motor 15 for driving said driven wheels 14D of the second set of wheels 14 is also shown in FIG. 6. Arranged opposite said pair of driven wheels 14D is a pair of passive wheels 14P of the second set of wheels 14. As shown in FIG. 6, said pair of passive wheels 14P is arranged in the external wall 28 of the remotely operated vehicle 50. A motor (not shown) for lifting/lowering second set of wheels 14 is provided in the motor section 16 of the vehicle 50. In the art, lifting and lowering of the set of wheels, in order to change direction of movement of the container handling vehicle from X-direction to Y-direction of FIG. 1, or vice versa, is known as "trackshift". Parts of a trackshift mechanism 17 are also shown.

FIG. 7 is a side view of a remotely operated vehicle 50 in accordance with another embodiment of the present invention. More precisely, a different trackshift mechanism is employed in the embodiment of FIG. 7. Parts of that trackshift mechanism 19 are shown in FIG. 7.

As easily inferred, a footprint of the shown remotely operated vehicle 50 is rectangular, whereas the vehicle body 10 has an asymmetric shape in a plane extending in YZ-direction.

Turning back to a first set of wheels 12 (discussed in conjunction with FIG. 6), a pair of driven wheels 12D of said first set of wheels 12 is provided in a motor section 16 of the remotely operated vehicle 50. Moreover, a wheel axle (not visible in FIG. 6, FIG. 7) associated with the pair of driven wheels 12D of the first set of wheels 12 is provided in the motor section 16 of the remotely operated vehicle 50. A drive motor 18 for powering the driven wheels 12D is provided in said motor section 16 that also holds a battery 26 of the remotely operated vehicle 50. The motor section 16 and a cavity section 20 are arranged side-by-side. The pair of passive wheels 12P is arranged on an opposite side of the center of gravity COG to the pair of driven wheels 12D. The passive wheels 12P of the first set of wheels 12 are not connected by means of a wheel axle and turn independently of one another. In this way, individual wheels are isolated and a possible wheel spin is contained to a single wheel of a wheel pair. A second set of wheels 14 is also shown (thoroughly discussed in conjunction with FIG. 6).

On a general level, the presence of non-driven wheels reduces the risk of these wheels starting to spin as a consequence of traction loss between the wheel and the supporting rail.

Still with reference to FIG. 7, a distance D1 between a center of one of the driven wheels 12D of the first set of wheels 12 and a thereto associated corner 13D of the vehicle 50 is larger than a distance D2 between a center of one of the passive wheels 12P of the first set of wheels 12 and a thereto associated corner 13P of the vehicle 50. In a related context, two driven wheels 12D of the first set of wheels are equisized and two passive wheels 12P of the first set of wheels are equisized. The two driven wheels 12P have larger diameter than the two passive wheels 12P.

Providing smaller passive wheels 12P and larger driven wheels 12D entails that the passive wheels 12P may be moved closer to the corner of the vehicle 13P, i.e. closer to the peripheral edge of the vehicle. The result is a more stable vehicle having passive wheels less prone to spinning.

Figure 8:
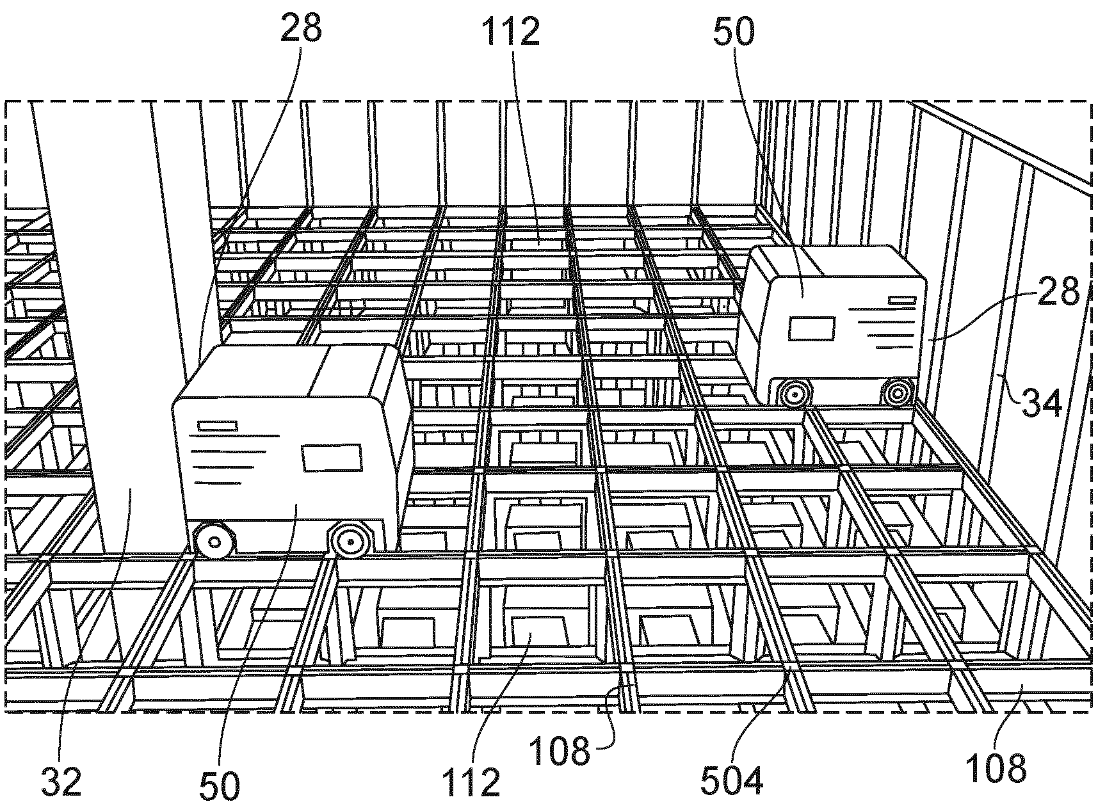
FIG. 8 contextualizes the invention by showing two different scenarios where a remotely operated vehicle in accordance with an embodiment of the present invention is positioned on the rails of the framework structure.

FIG. 8 contextualizes the present invention by showing two different scenarios where remotely operated vehicles are positioned on the rails of rail system 108 of the framework structure.

As shown in FIG. 8 a vehicle 50 is positioned above a storage column being immediately adjacent a roof supporting column 32. By virtue of its design, the vehicle 50 is able to access goods holders stored in said storage column. More specifically, the cavity section (shown and discussed in conjunction with FIG. 5, FIG. 6) of the vehicle 50 includes a peripheral external wall 28 facing the roof supporting column 32. The external wall 28 is flat and perpendicular to a horizontal (XY) plane. When the flat, external wall 28 of the vehicle 50 is very close to or even abutting the roof supporting column 32, the cavity section is aligned with the storage column below such that the goods holder may be vertically extracted by the remotely operated vehicle 50.

The other one of the remotely operated vehicles 50 shown in FIG. 8 is shown positioned at the periphery of a grid structure, adjacent to a protective fence 34 delimiting the grid structure. Analogously to what has been discussed in connection with the first remotely operated vehicle 50 of FIG. 8, the external wall 28 of the vehicle 50 being flat and perpendicular to a horizontal (XY) plane entails above-discussed benefits, such as improved capability to retrieve goods holders that are difficult to access.

A common feature of the two scenarios of FIG. 8 is the remotely operated vehicle 50, when lifting goods holders from a storage column or lowering goods holders into the storage column, covers a single storage column across in one horizontal direction of the rail system 108 and covers between one and two storage columns across in another horizontal direction of the rail system 108. For a given grid size, this relatively small vehicle footprint opens for usage of larger number of remotely operated vehicles than what was previously feasible. More specifically, in one of the horizontal directions it is possible for two operating vehicles 50, to occupy adjacent grid positions so that the flat, external wall 28 of vehicle 50 faces the flat, external wall 28 of another vehicle 50.

Sensor Arrangement

The sensor arrangement will be described in connection with mounting on a vehicle 50 as described above, however it should be understood that the sensor 600 could be mounted on a vehicle of a different configuration if size and shape permit the correct position of the sensor 600 with respect to operation of the track shift mechanism and the relative distance between sensors location on the vehicle and the vehicle's gripping device 404, so that a gripping device 404 of the vehicle is positioned over an access opening 112 when the sensor detects a terminal end 506 of a track wall 502 at an intersection 504.

Figure 9:
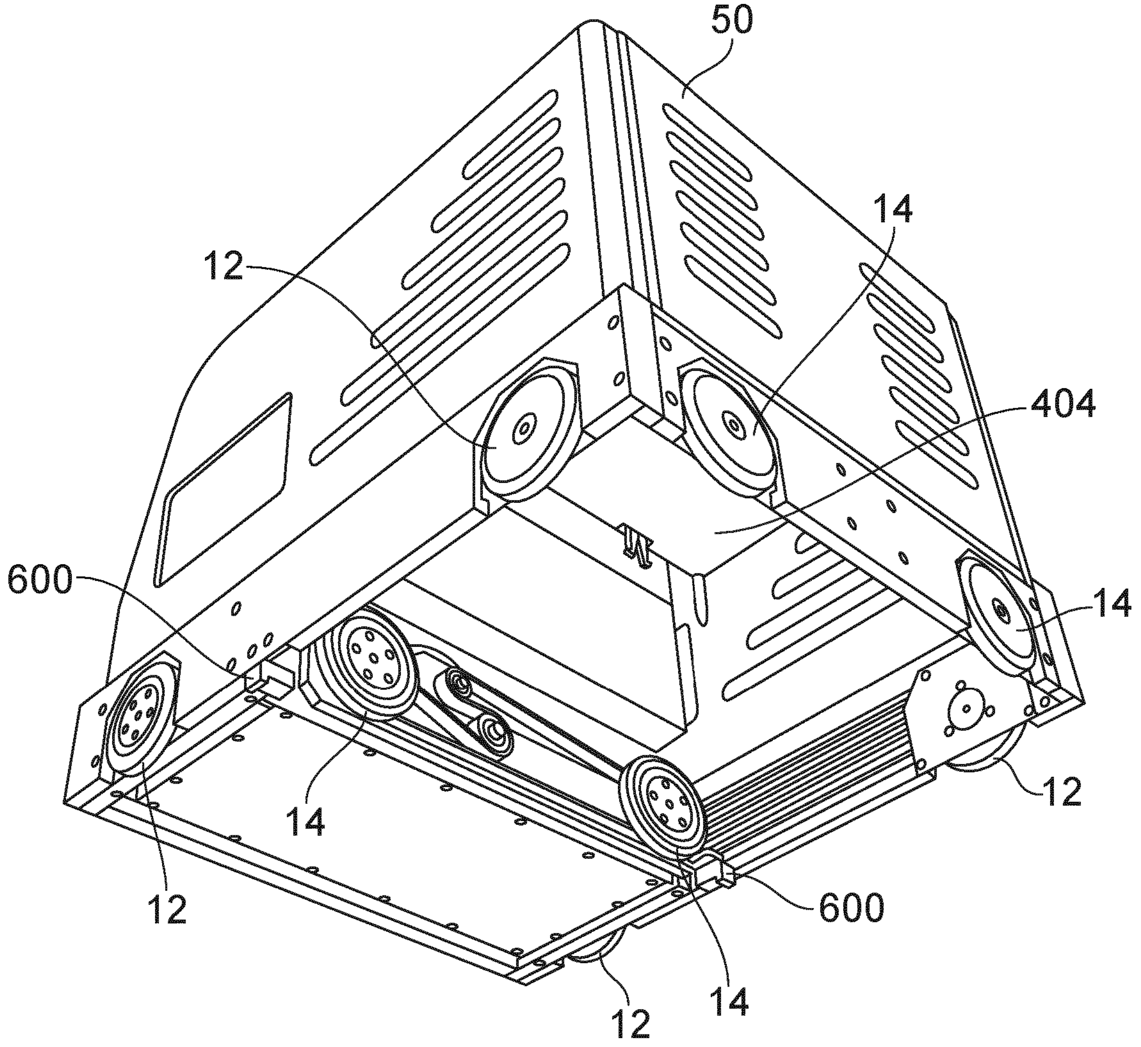
FIG. 9 shows a remotely operated vehicle seen from below with sensors attached to vehicle.

A seen in FIG. 9, the sensor arrangement of the present invention comprises one or more sensors 600 connected to a remotely operated vehicle 50. As will be described below, the sensors are mounted at a position on the vehicle such that sensors 600 are able to directly detect when gripping device 404 is correctly positioned over an access opening 112.

Figure 10A:
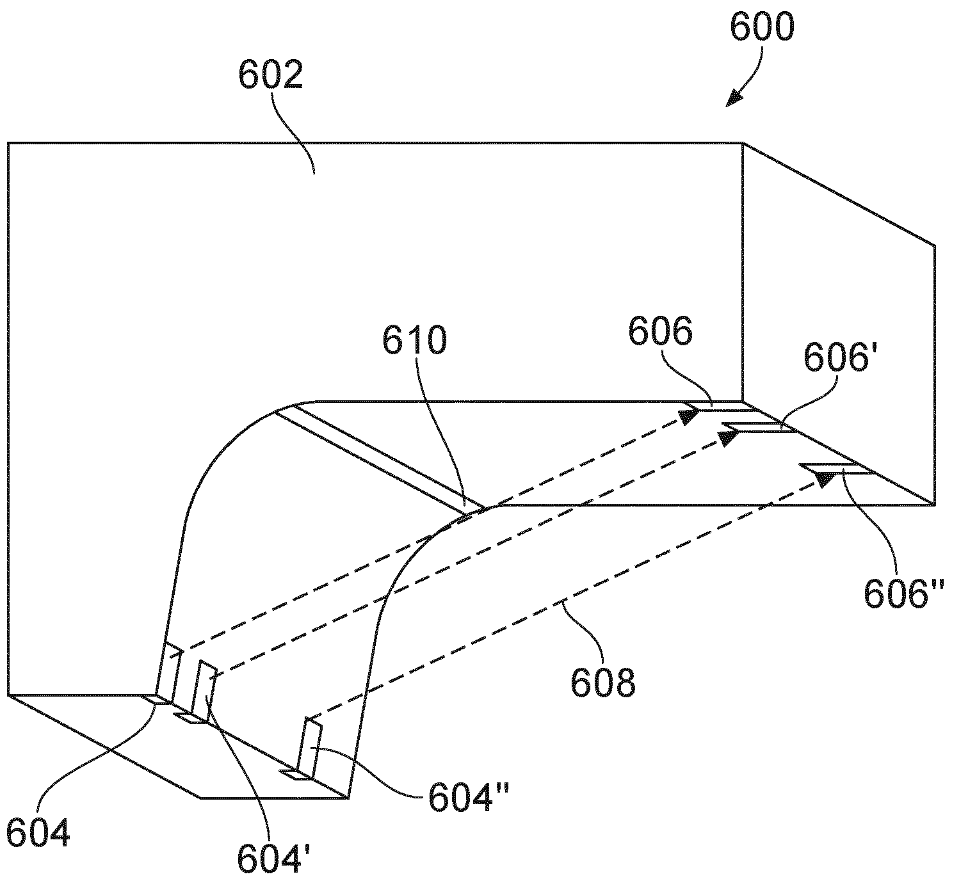
FIG. 10A and FIG. 10B show alternate embodiments of a sensor body.
Figure 10B:
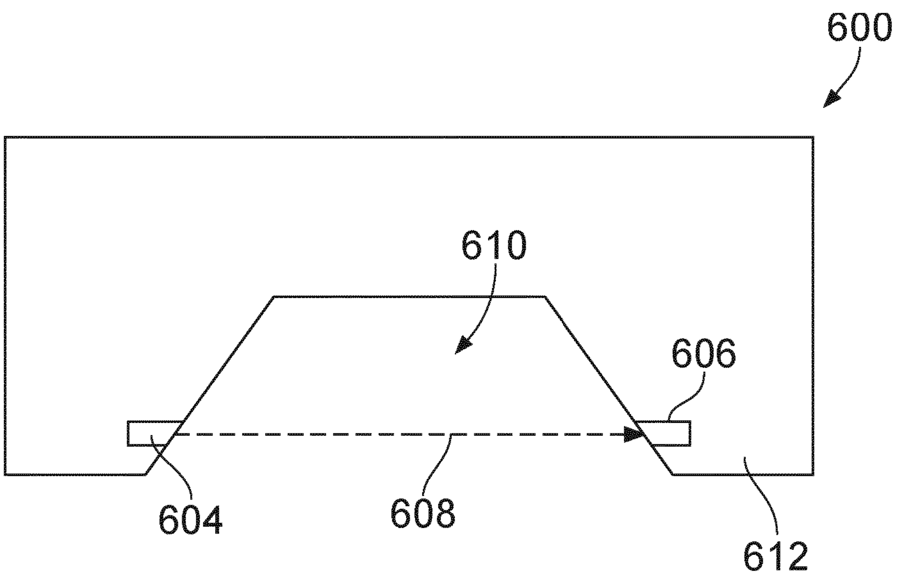

FIG. 10A and FIG. 10B illustrate alternate embodiments of sensor 600. Sensor 600 comprises a sensor body 602, on which is mounted a plurality of emitters 604 and detectors 606, in particular a leading emitter 604, a first trailing emitter 604' and a second trailing emitter 604". Emitters 604 emit beams 608 of energy which are detected by detectors 606. Beams 608 traverse a recess 610. In the embodiment shown in FIG. 10A, sensor body 602 is L-shaped, with emitters 604 mounted on the short leg of the L, and the detectors mounted near the end of the long leg of the L, with the space therebetween defining recess 610. In the embodiment shown FIG. 10B, the emitters and detectors are mounted on extended legs 612, with the space therebetween defining recess 610.

Figure 11:
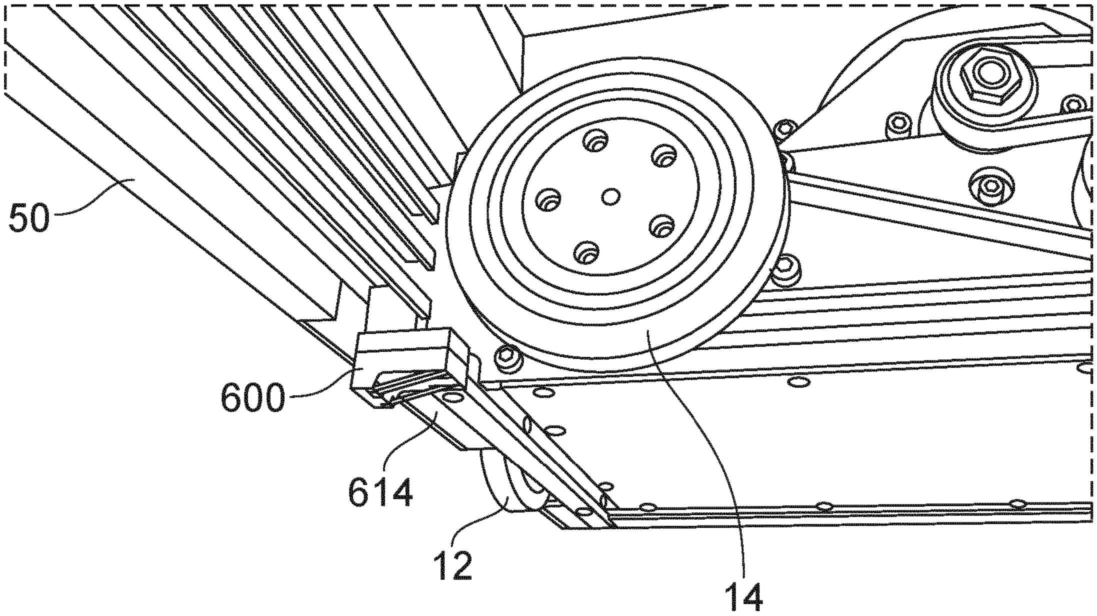
FIG. 11 and FIG. 12 show sensors mounted to the underside of a remotely operated vehicle.
Figure 12:
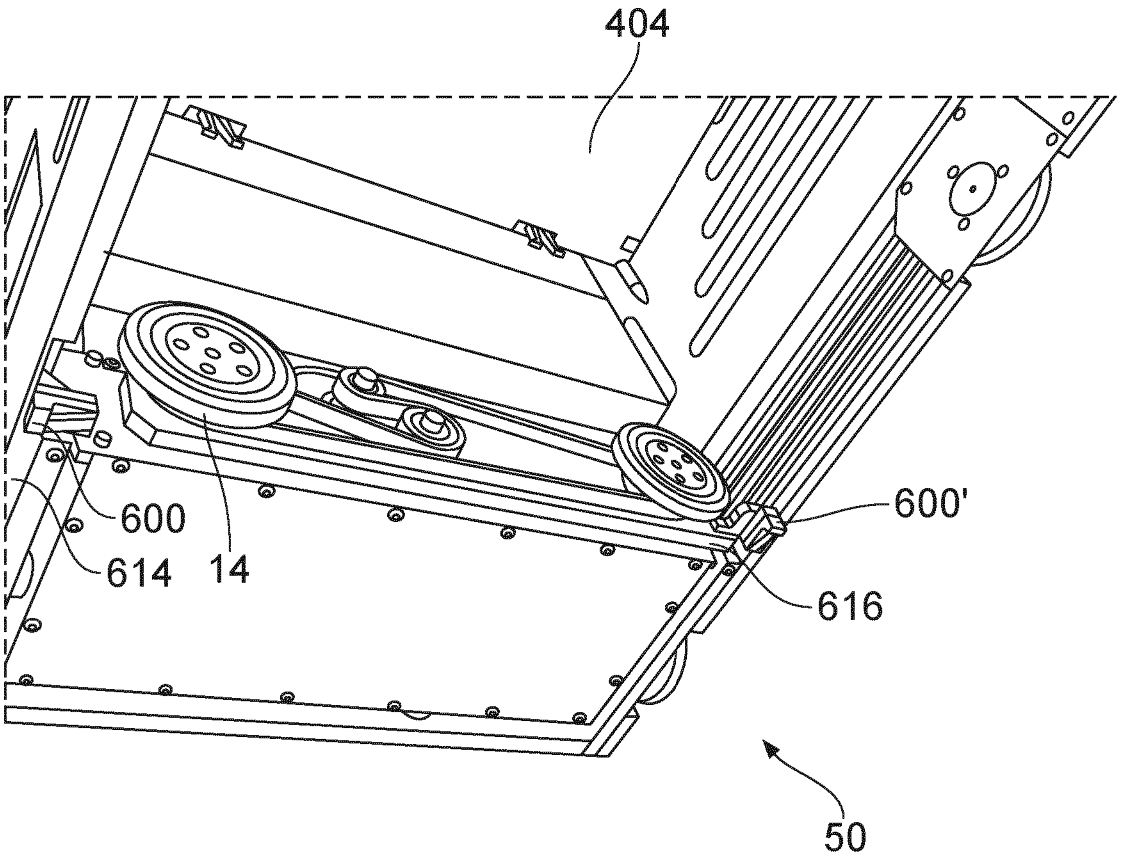

FIG. 11 shows a sensor 600 mounted to the underside of a remotely operated vehicle 50. Sensor 600 is mounted to a body frame 614. Second set of wheels 14 (one wheel of set shown) are raisable and lowerable as part of a trackshift operation. When wheels 14 are lowered, sensor 600 will be raised. When wheels 14 are raised, sensor 600 will be lowered. FIG. 12 again shows sensor 600 mounted on body frame 614, but allow shows a second sensor 600' mounted on a moveable wheel frame 616. Wheel frame 616 moves up and down, together with wheels 14, during a trackshift operation. In contrast with sensor 600, sensor 600' will be lowered when wheels 14 are lowered, and raised when wheels 14 are raised. Thus will sensor 600 be lowered into a track when the vehicle travels in a first direction, while sensor 600' will be lowered into a track when the vehicle travels in a second direction.

Figure 13:
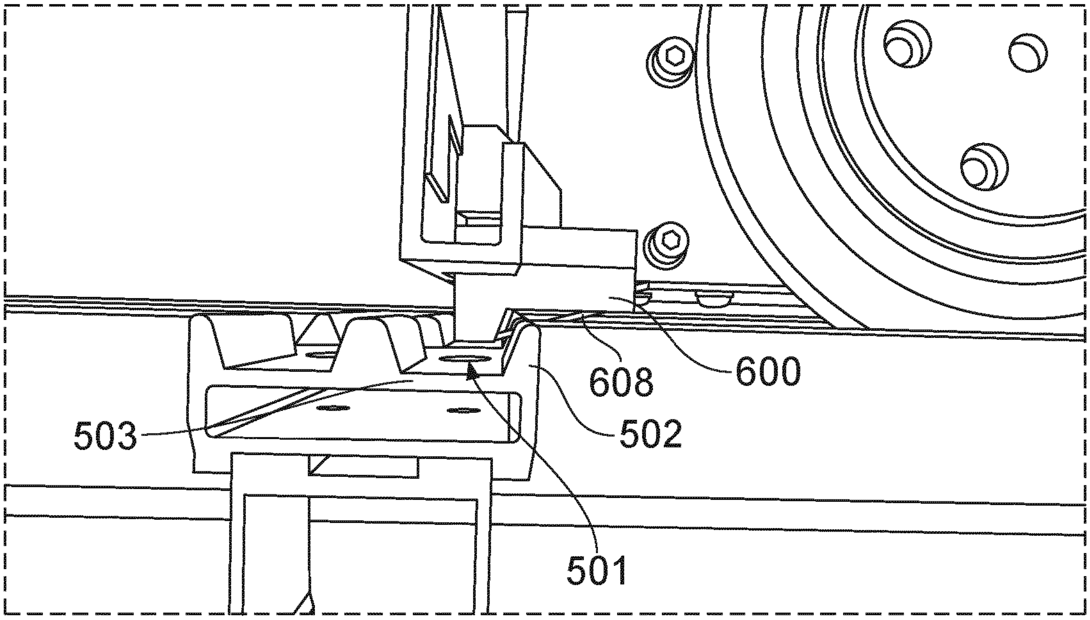
FIG. 13 and FIG. 14 show a sensor lowered into a groove of a track

FIG. 13 illustrates sensor 600 lowered into groove 501 of track 503. As can be seen, track wall 502 blocks beam 608 from reaching its corresponding detector.

Figure 14:
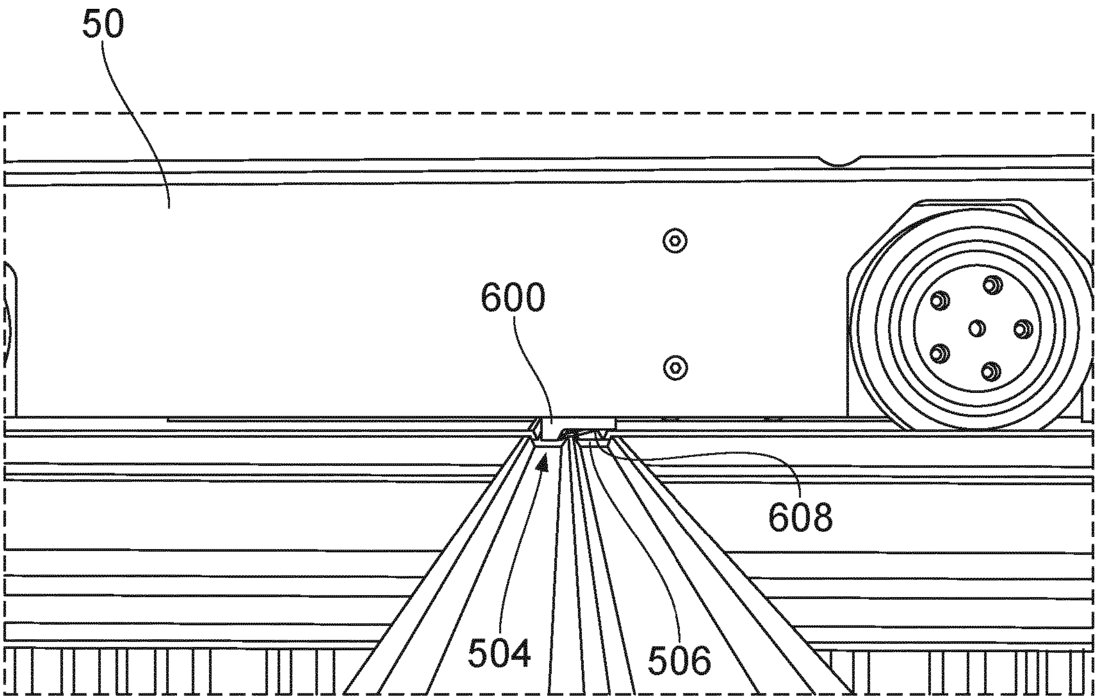

FIG. 14 shows a sensor 600 encountering an intersection 504. As described above, tracks 503 terminate at intersections 504 at terminal ends 506. As shown, beam 608 is thus not blocked by track wall 502 at intersections.

Figure 15:
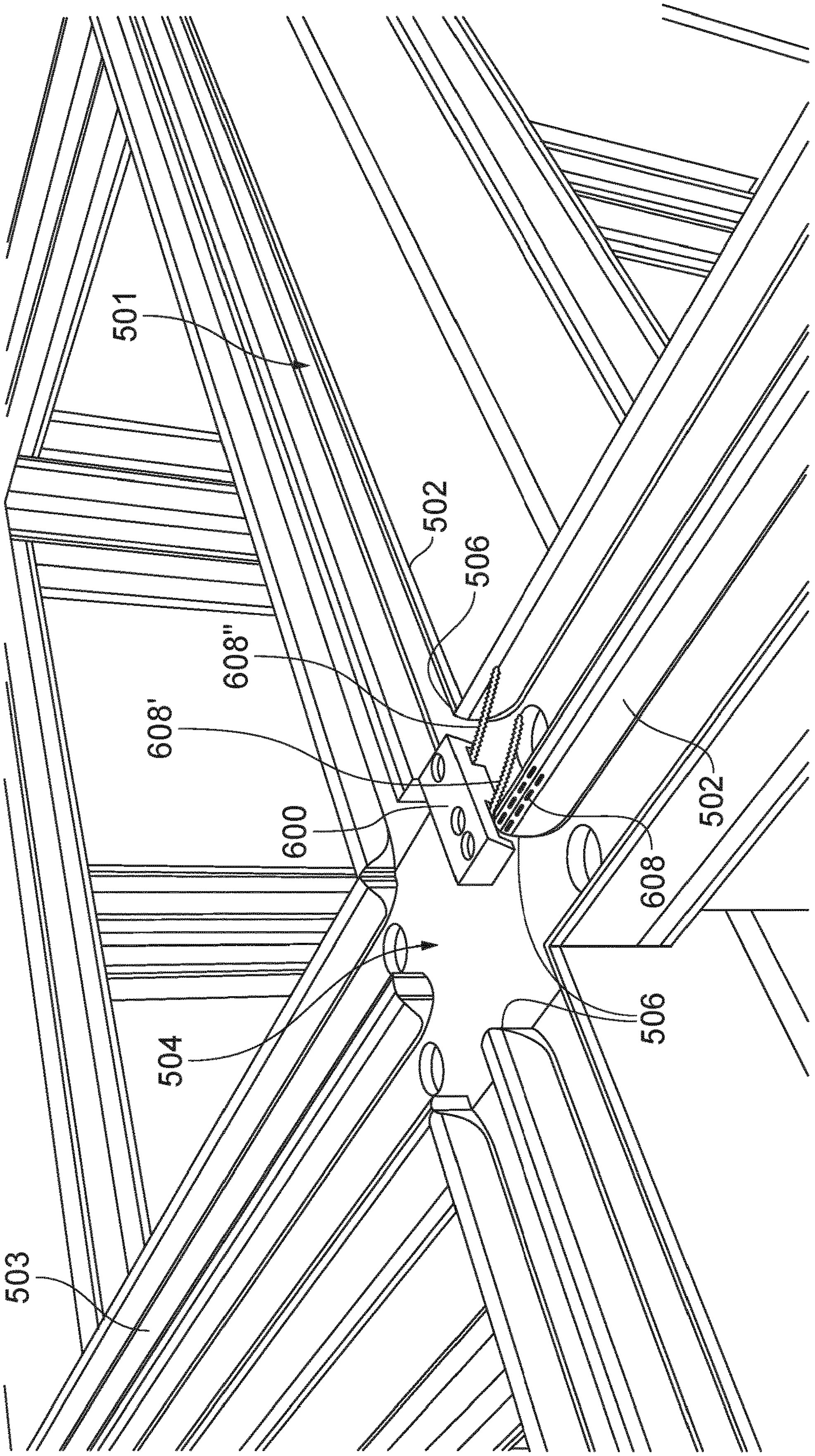
FIG. 15 illustrates an embodiment of the invention with a sensor correctly positioned with respect to an intersection, with the vehicle not illustrated for ease of viewing.
Figure 16:
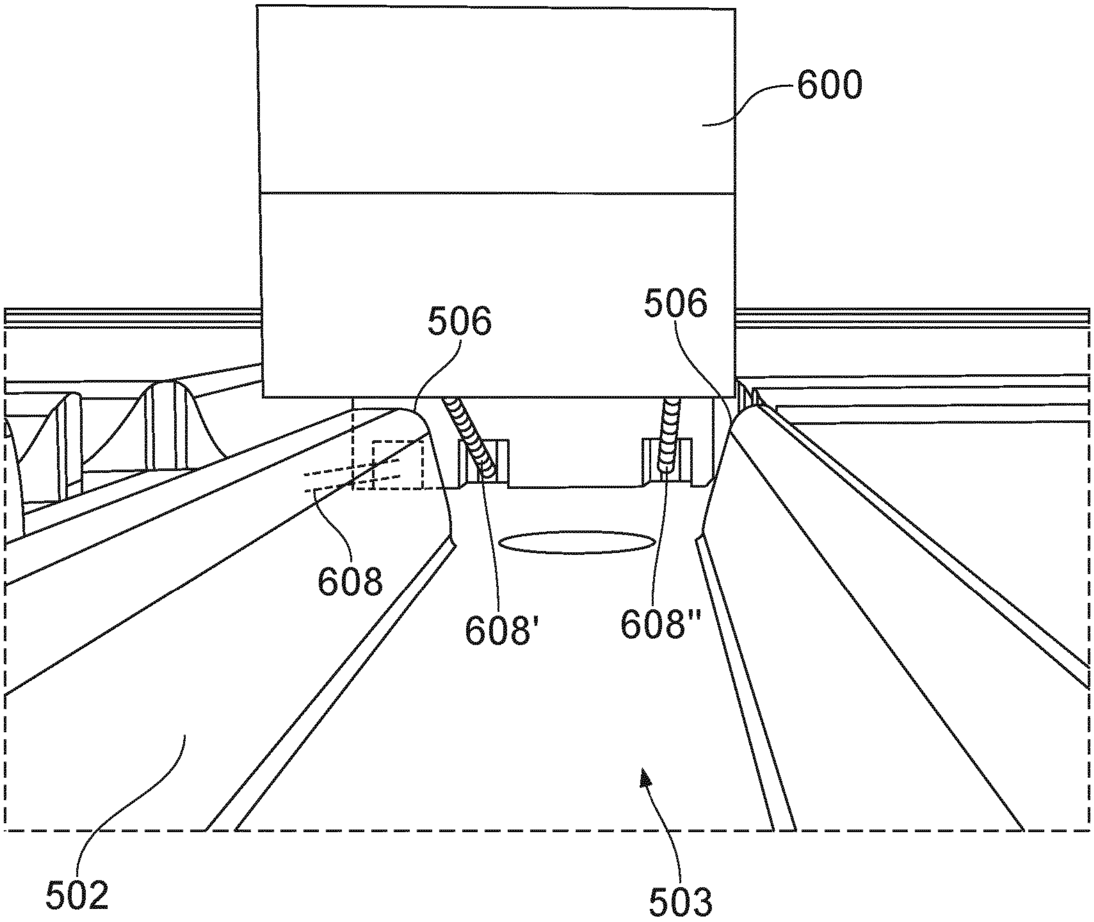
FIG. 16 is a detailed side perspective view of the sensor from FIG. 15.

This is also shown in FIG. 15 and FIG. 16, which illustrate the embodiment of the sensor from FIG. 10A having a leading emitter 604, a first trailing emitter 604' and a second trailing emitter 604" (with corresponding beams 608). Vehicle 50 has been omitted for case of viewing. FIG. 15 only shows the short leg of the L-shaped sensor body (on which the emitters are mounted) also for case of viewing. FIG. 15 and FIG. 16 illustrate sensor 600 correctly positioned with respect to intersection 504. As shown, sensor 600 is positioned with respect to an intersection 504 such that leading beam 608 is blocked by a terminal end 506 of a track wall 502, while first trailing beam 608' and second trailing beam 608" are positioned within the intersection such that they can reach their respective detectors. As can be appreciated from FIG. 16, the distance between the emitters corresponds to a tolerance deviation of position of the sensor between track walls of a track. According to one aspect, the distance between the leading emitter (604, producing beam 608) and the first trailing emitter (604') is less than the width of the track walls (502), and the distance between the first trailing emitter (604', producing beam 608') and the second trailing emitter (604", producing beam 608") is between 0-4 mm less than the width of the groove (501) of the track (503), preferably 2-4 mm less. Thus the sensor can deviate under 2 mm, preferably from 1-2 mm, and most preferably 1.5 mm within a groove.

Figure 17:
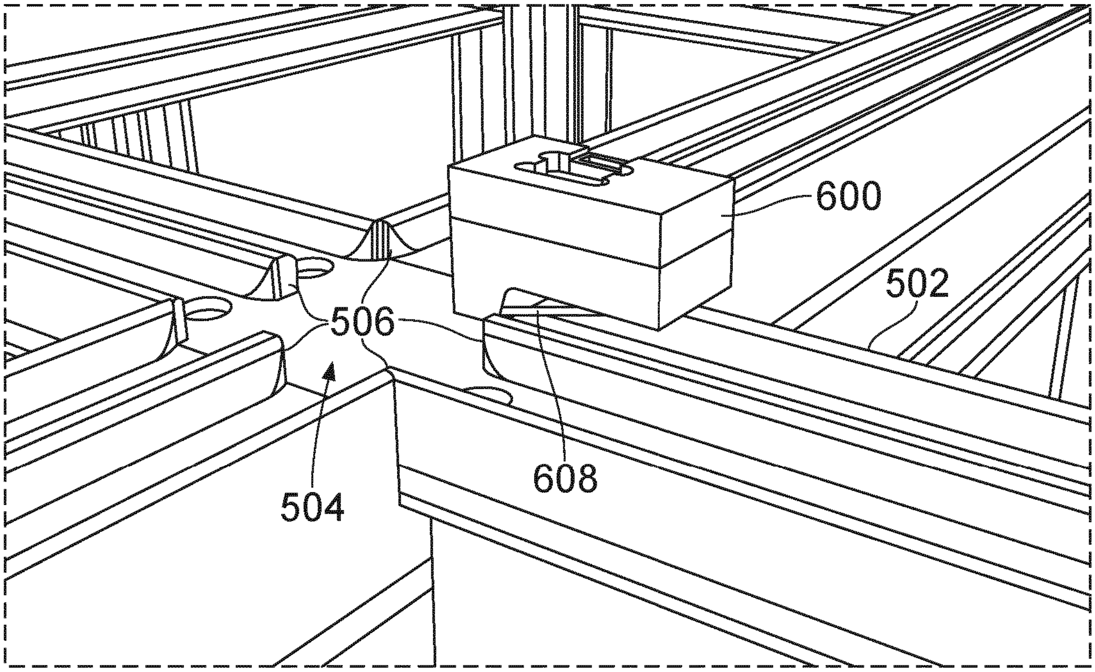
FIG. 17 and FIG. 18 illustrate a sensor entering an intersection, but not yet advanced to the position of correct alignment.
Figure 18:
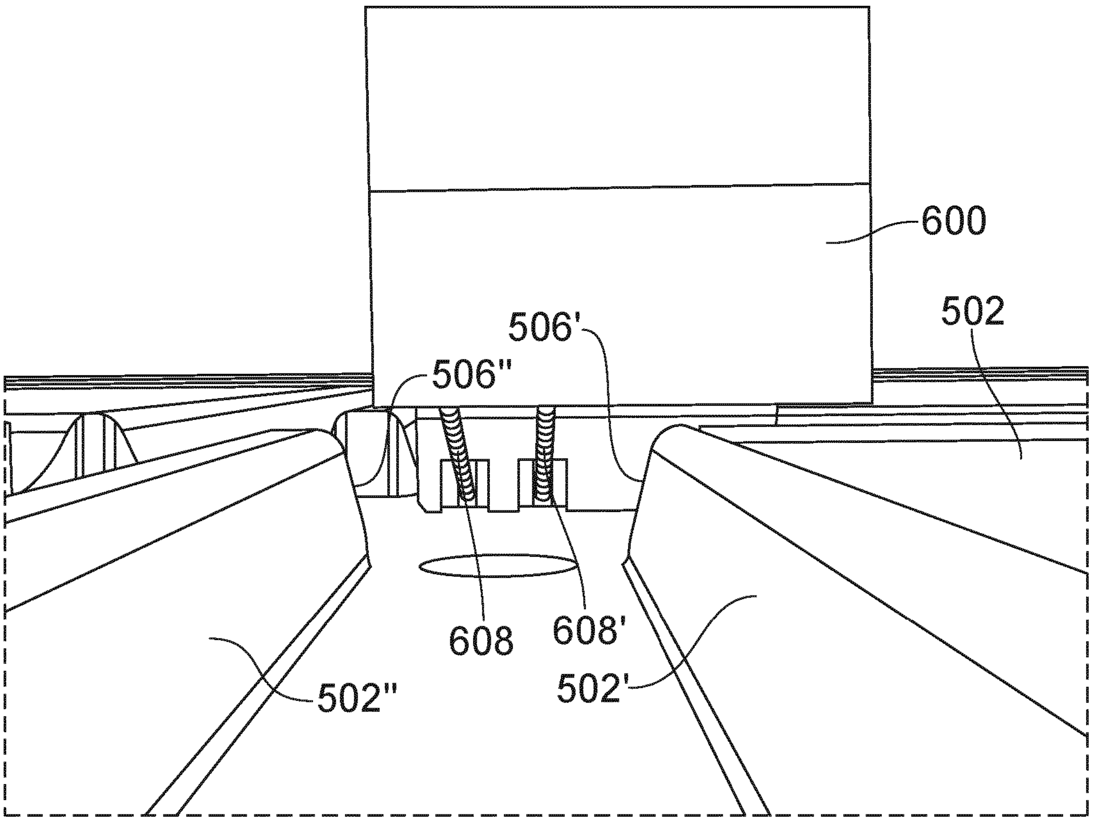

FIG. 17 and FIG. 18 illustrate a sensor as it advances toward the correct position. As the vehicle approaches an intersection adjacent an access opening of interest, the sensor will first pass a terminal end 506' of a first track wall 502'. As the sensor moves forward, leading beam 608 will first be detected, then the first trailing beam 608' will be detected. Second trailing beam 608" will still be blocked by track wall 502. As the vehicle advances further, beam 608 will eventually be blocked by second terminal end 506" of second track wall 502", and be positioned as shown in FIG. 15 and FIG. 16. Until then the sensor, via communication with control system 500, recognizes that the vehicle is not yet in the correct position.

Figure 19:
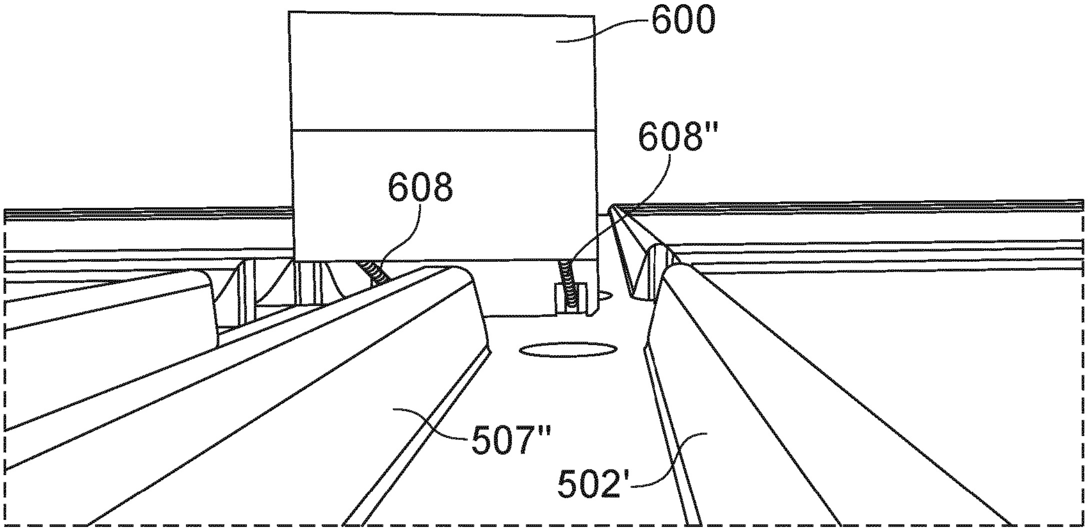
FIG. 19 illustrates a sensor having advanced past the position of correct alignment

FIG. 19 illustrates a sensor that has advanced past the correct position. Sensor 600 has advanced such that leading beam 608 and second trailing beam 608" are detected, while first trailing beam 608' is blocked by second track wall 502". If desired, the vehicle could be reversed until leading beam 608 is blocked as illustrated in FIG. 15 in order to reposition the vehicle.

Figure 20:
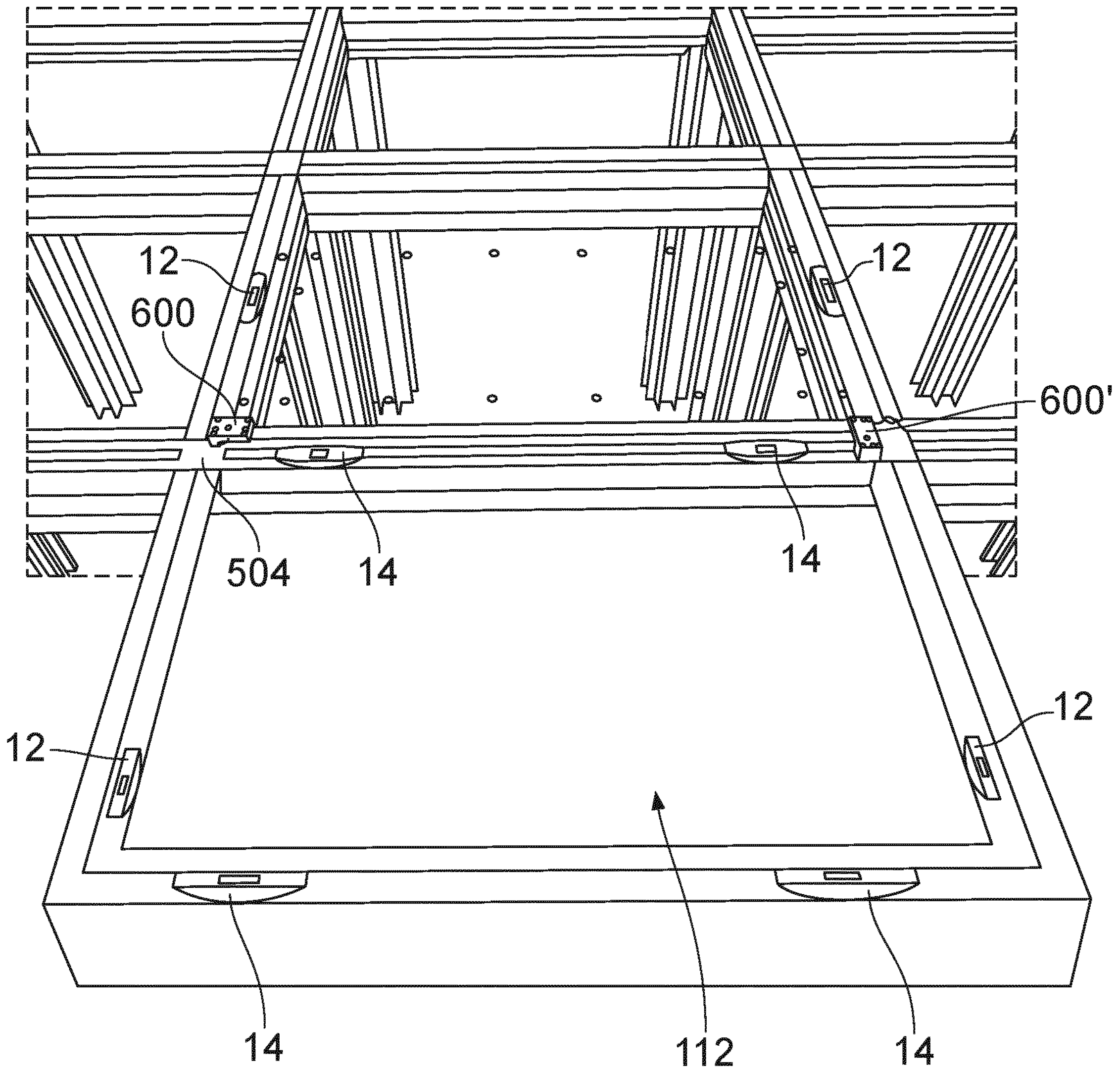
FIG. 20 illustrates a sensor aligned with respect to an access opening of interest.

FIG. 20 (viewed in conjunction with FIG. 9) illustrates that sensors 600 and 600' are mounted on the vehicle 50 such that the gripping device 404 of the vehicle is positioned over an access opening 112 of interest when a sensor detects an adjacent intersection 504, by virtue the sensor being positioned as shown in FIG. 15 and FIG. 16. In FIG. 20 the vehicle body has been omitted for ease of viewing, however the placement of wheels 14 and 12, when viewed in conjunction with FIG. 9, demonstrate the point.

In the preceding description, various aspects of the track sensor arrangement for a storage and retrieval system have been described with reference to the illustrative embodiments. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

Prior Art (FIG. 1-5)

1 Prior art automated storage and retrieval system
100 Framework structure
102 Upright members of framework structure
104 Storage grid
105 Storage column
106 Storage container
106' Particular position of storage container
107 Stack
108 Rail system
110 Parallel rails in first direction (X)
111 Parallel rails in second direction (Y)
112 Access opening
119 First port column
120 Second port column
201 Prior art container handling vehicle
201*a* Vehicle body of the container handling vehicle 201
201*b* Drive means/wheel arrangement/first set of wheels in first direction (X)
201*c* Drive means/wheel arrangement/second set of wheels in second direction (Y)
301 Prior art cantilever container handling vehicle
301*a* Vehicle body of the container handling vehicle 301
301*b* Drive means/first set of wheels in first direction (X)
301*c* Drive means/second set of wheels in second direction (Y)
304 Gripping device
401 Prior art container handling vehicle
401*a* Vehicle body of the container handling vehicle 401
401*b* Drive means/first set of wheels in first direction (X)
401*c* Drive means/second set of wheels in second direction (Y)
404 Gripping device
404*a* Lifting band
404*b* Gripper
404*c* Guide pin
404*d* Lifting frame
500 Control system
501 Groove
502 Upwardly protruding member/track wall
503 Track
504 Intersection

506 Terminal ends of track walls
508
510
X First direction
Y Second direction
Z Third direction Vehicle Embodiment

10 Vehicle body
12 First set of wheels
12D Driven wheels of first set
12P Passive wheels of first set
13D Vehicle corner associated with driven wheels
13P Vehicle corner associated with passive wheels
14 Second set of wheels
14D Driven wheels of the second set of wheels
14P Passive wheels of the second set of wheels
15 Motor for driving second set of wheels
16 Motor section
17 Parts of first trackshift mechanism
18 Drive motor
19 Parts of first trackshift mechanism
20 Cavity section
22 Cavity
26 Battery
28 External wall
30 Crosspiece
32 Roof-supporting column
34 Protective fence
50 Remotely operated vehicle
COG Center of Gravity
D1 Distance driven wheel-to-corner
D2 Distance passive wheel-to-corner
600/600' Sensor
602 Sensor body
604 Emitter
606 detector
608 beams
610 recess
612 legs
614 body frame
616 wheel frame

The invention claimed is:

1. A track sensor arrangement, comprising:

an automated, wheeled vehicle arranged to travel along a grid-based rail system, the rail system comprising a plurality of parallel rails arranged in a first direction and a plurality of parallel rails arranged in a second direction, the rails in the first and second directions intersecting perpendicularly to form of a plurality of intersections defining a plurality of grid access openings, each rail provided with either a single track or a pair of parallel tracks for wheels of the vehicle, each track being in the form of a groove defined by upwardly projecting track walls said track walls terminating at terminal ends at the intersections, the vehicle being able to change its direction of travel from the first direction to the second direction by alternately raising or lowering sets of wheels into and out of the tracks, a first set of wheels arranged for travel in the first direction and a second set of wheels arranged for travel in the second direction; and a sensor attached to the vehicle and arranged such that the sensor is lowered or raised when the first set of wheels is lowered or raised, the sensor comprising:

a sensor body having a recess arranged to receive a track wall of a track when the first set of wheels is lowered into the track;

a plurality of emitters, each arranged to emit a beam of energy, and one or more corresponding detectors arranged to detect the beams of energy from the emitters;

wherein the emitters and the corresponding detector or detectors are arranged on opposite sides of the recess, such that the track wall blocks the beam emitted from the emitters from reaching their corresponding detectors when the first set of wheels is lowered into the track;

wherein the sensor is attached to the vehicle at a position whereby a beam from an emitter can reach its corresponding detector when a predetermined part of the vehicle is positioned over an access opening of interest.

2. The track sensor arrangement according to claim 1, wherein the predetermined part of the vehicle is a gripping device arranged to grip a storage container stored in a storage column below the access opening.

3. The track sensor according to claim 2, wherein the sensor comprises a leading emitter, a first trailing emitter, and a second trailing emitter, and whereby the sensor is mounted on the vehicle at a position whereby the gripping device of the vehicle is aligned over an access opening of interest when the beam of the leading emitter is blocked from reaching its corresponding detector by a structure of an adjacent intersection while the beams of the first and second trailing emitters reach their respective detectors.

4. The track sensor according to claim 3, wherein a first distance between the leading emitter and the first trailing emitter is less than a first width of the track walls, and a second distance between the first trailing emitter and the second trailing emitter is between 0-4 mm less than a second width of the groove of the track, preferably 2-4 mm less.

5. The track sensor according to claim 1, wherein a distance between two emitters corresponds to a predetermined margin of tolerance for the position of the vehicle in relation to the intersection.

6. The track sensor according to claim 1, further comprising a control system in electronic communication with the sensor.

7. The track sensor according to claim 1, wherein the sensor body is L-shaped with the emitters arranged on a short leg of the L and the detectors arranged on a long leg of the L.

8. A method for determining a position of an automated vehicle operating on a grid-based rail system, the rail system comprising a first plurality of parallel rails arranged in a first direction and a second plurality of parallel rails arranged in a second direction, the rails in the first direction and the second direction intersecting perpendicularly to form of plurality of intersections defining a plurality of grid access openings, each rail provided with either a single track or a pair of parallel tracks for wheels of the vehicle, each track being in the form of a groove defined by upwardly projecting track walls said track walls terminating at terminal ends at the intersections, the vehicle being able to change its direction of travel from the first direction to the second direction by alternately raising or lowering sets of wheels into and out of the tracks, a first set of wheels arranged for travel in the first direction and a second set of wheels arranged for travel in the second direction, the method comprising:

providing a sensor, the sensor comprising:

a sensor body having a recess arranged to receive a track wall of a track when the first set of wheels is lowered into the track; and a plurality of emitters, each arranged to emit a beam of energy, and one or more corresponding detectors arranged to detect the beams of energy from the emitters;

wherein the emitters and the corresponding detector or detectors are arranged on opposite sides of the recess, such that the track wall blocks the beam emitted from the emitters from reaching their corresponding detectors when the first set of wheels is lowered into the track;

attaching the sensor to the vehicle at a position whereby a beam from an emitter is capable of reaching its corresponding detector while a predetermined part of the vehicle is positioned over an access opening of interest;

lowering the first set of wheels of the vehicle into a track in order for the vehicle to travel in the first direction, whereby the sensor is also lowered such that the track wall enters the recess and blocks the beams from the emitters from reaching their corresponding detectors;

causing the vehicle to travel in the first direction until the beam from an emitter passes the terminal end of a track wall at an intersection adjacent to the access opening of interest; and stopping the vehicle when the sensor is positioned relative to the adjacent intersection such that the predetermined part of the vehicle is aligned over the access opening of interest.

9. The method according to claim 8, wherein the predetermined part of the vehicle is a gripping device arranged to grip an item stored below the access opening.

10. The method according to claim 9, wherein the item is a container of a stack of containers arranged in a storage column beneath the access opening.

11. The method according to claim 9, wherein the sensor comprises a leading emitter, a first trailing emitter, and a second trailing emitter, and said emitters located on the sensor body such that the gripping device of the vehicle is aligned over the access opening when the beam of the leading emitter is blocked from reaching its corresponding detector by a track wall while the first and second emitters are positioned in intersection such that their beams reach their corresponding detectors.

12. The method according to claim 11, wherein a structure that blocks the beam from the leading emitter when the gripping device is aligned over the access opening is a terminal end of a track wall.

13. The method according to claim 12, wherein a first distance between the leading emitter and the first trailing emitter is less than a first width of the track walls, and a second distance between the first trailing emitter and the second trailing emitter is between 0-4 mm less than a second width of the groove of the track, preferably 2-4 mm less.

14. The method according to claim 11, further comprising determining that the vehicle is out of position with respect to the access opening of interest when:

the beam from the leading emitter and the beam from the first trailing emitter are detected by their corresponding detectors while the beam from the second trailing emitter is blocked from reaching its detector, or the beams from the leading emitter and the second trailing emitter are detected by their corresponding detectors while the beam from the first trailing emitter is blocked, or the beams from all three emitters are detected by their corresponding detectors.

15. The method according to claim 14, further comprising repositioning a vehicle that is determined to be out of position by moving the vehicle until the beam from the leading emitter is blocked from reaching its detector while the beams from the first and second trailing emitters are detected.

16. The method according to claim 8, wherein the sensor is in electronic communication with a control system, the control system directing the positioning of the vehicle in response to input from the sensor.

* * * * *